US012404719B2

(12) United States Patent
Diehl et al.

(10) Patent No.: US 12,404,719 B2
(45) Date of Patent: Sep. 2, 2025

(54) ANTENNA FOR A MOTORIZED WINDOW TREATMENT

(71) Applicant: Lutron Technology Company LLC, Coopersburg, PA (US)

(72) Inventors: Marissa Diehl, Breinigsville, PA (US); David A. Kirby, Zionsville, PA (US); Sheng Qu, Allentown, PA (US); John M. Steinmetz, Philadelphia, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 510 days.

(21) Appl. No.: 17/825,671

(22) Filed: May 26, 2022

(65) Prior Publication Data

US 2022/0381085 A1 Dec. 1, 2022

Related U.S. Application Data

(60) Provisional application No. 63/227,252, filed on Jul. 29, 2021, provisional application No. 63/193,433, filed on May 26, 2021.

(51) Int. Cl.
*E06B 9/72* (2006.01)
*E06B 9/68* (2006.01)

(52) U.S. Cl.
CPC ........ *E06B 9/72* (2013.01); *E06B 2009/6809* (2013.01)

(58) Field of Classification Search
CPC ..... E06B 9/42; E06B 9/50; E06B 9/72; E06B 2009/6809; E06B 9/44; E06B 9/40; E06B 9/68
See application file for complete search history.

(56) References Cited

U.S. PATENT DOCUMENTS 6,497,267 B1 12/2002 Azar et al.
7,723,939 B2 5/2010 Carmen et al.
8,950,461 B2 2/2015 Ogden et al.
9,488,000 B2 11/2016 Kirby et al.
9,598,901 B2 3/2017 Kirby et al.
(Continued)

FOREIGN PATENT DOCUMENTS

KR 101875718 B1 * 8/2018
WO 2020142807 A1 7/2020

OTHER PUBLICATIONS

KR 101875718 machine translation (Year: 2018).*

*Primary Examiner* — Abe Massad
(74) *Attorney, Agent, or Firm* — Flaster Greenberg P.C.

(57) ABSTRACT

A motorized window treatment may comprise an antenna that allows for wireless communication. The motorized window treatment may comprise a roller tube, a motor drive unit, and at least one mounting bracket. The roller tube may be configured to windingly receive a flexible material and to be rotated to raise and lower the flexible material. The mounting bracket may be configured to support a bearing assembly of the motor drive unit to allow the roller tube to rotate with respect to the mounting bracket. The bearing assembly may be located between the roller tube and the mounting bracket, so as to form a gap between the roller tube and the mounting bracket. The antenna may comprise an electrical conductor wrapped around the motor drive unit adjacent to the gap between the roller tube and the mounting bracket.

23 Claims, 16 Drawing Sheets

(56) References Cited

U.S. PATENT DOCUMENTS

| | | | | |
|---|---|---|---|---|
| 10,094,169 | B2 | 10/2018 | Kirby | |
| 10,737,644 | B2 * | 8/2020 | Taylor | E04F 10/0607 |
| 10,934,773 | B2 * | 3/2021 | Lemaitre | E06B 9/64 |
| 11,316,370 | B2 * | 4/2022 | Poirier | H02J 50/10 |
| 11,633,059 | B2 * | 4/2023 | Mullet | A47H 5/0325 160/331 |
| 2013/0105095 | A1 | 5/2013 | Anderson et al. | |
| 2014/0000818 | A1 * | 1/2014 | Anderson | E06B 9/40 160/310 |
| 2015/0333510 | A1 * | 11/2015 | Mullet | H01Q 1/50 361/33 |
| 2016/0032647 | A1 * | 2/2016 | Adreon | F16H 1/46 310/68 B |
| 2016/0326801 | A1 | 11/2016 | Blair et al. | |
| 2017/0241201 | A1 * | 8/2017 | Buccola, Jr. | H02K 7/003 |
| 2020/0018118 | A1 * | 1/2020 | Geiger | A47H 1/13 |
| 2020/0165866 | A1 * | 5/2020 | Holt | H01H 15/005 |
| 2020/0300033 | A1 * | 9/2020 | Fisher, II | E06B 9/56 |
| 2021/0363820 | A1 * | 11/2021 | Friman | H02K 11/0094 |
| 2021/0363822 | A1 | 11/2021 | Blair et al. | |
| 2022/0120135 | A1 * | 4/2022 | Botha | H02J 7/0063 |
| 2023/0074389 | A1 * | 3/2023 | Fisher, II | E06B 9/174 |

* cited by examiner

ANTENNA FOR A MOTORIZED WINDOW TREATMENT

CROSS-REFERENCE TO RELATED APPLICATIONS

This application claims priority to U.S. provisional patent application No. 63/193,433, filed May 26, 2021, and U.S. provisional patent application No. 63/227,252, filed Jul. 29, 2021, which are incorporated herein by reference in their entirety.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows over which the roller shade is mounted.

A typical window treatment can be mounted to structure surrounding a window, such as a window frame. Such a window treatment may include brackets at opposed ends thereof. The brackets may be configured to operably support the roller tube, such that the flexible material may be raised and lowered. For example, the brackets may be configured to support respective ends of the roller tube. The brackets may be attached to structure, such as a wall, ceiling, window frame, or other structure.

Such a window treatment may be motorized. A motorized window treatment may include a roller tube, a motor, brackets, and electrical wiring. The components of the motorized window treatment, such as the brackets, the roller tube, electrical wiring, etc. may be concealed by a fascia or installed in a pocket out of view.

SUMMARY

As described herein, a motorized window treatment may comprise an antenna that allows for wireless communication. The motorized window treatment may comprise a roller tube, a motor drive unit, and at least one mounting bracket. The roller tube may be configured to windingly receive a flexible material and to be rotated to raise and lower the flexible material. The motor drive unit may be received within a cavity of the roller tube. The motor drive unit may comprise a motor configured to rotate the roller tube and a bearing assembly coupled to the roller tube, such that the roller tube is configured to rotate around the motor drive unit. The mounting bracket may be configured to support the bearing assembly of the motor drive unit to allow the roller tube to rotate with respect to the mounting bracket. The bearing assembly may be located between the roller tube and the mounting bracket, so as to form a gap between the roller tube and the mounting bracket. The antenna may comprise an electrical conductor wrapped around the motor drive unit adjacent to the gap between the roller tube and the mounting bracket. For example, the antenna may be configured to be spirally wound around the motor drive unit proximate to the gap between the roller tube and the mounting bracket.

A motorized window treatment may comprise a roller tube, a motor drive unit, and at least one mounting bracket. The roller tube may be configured to windingly receive a flexible material. The roller tube may be configured to be rotated to raise and lower the flexible material. The motor drive unit may be received within a cavity of the roller tube. The motor drive unit may comprise a motor, a housing, and an antenna. The motor may be configured to rotate the roller tube. The housing may be configured to house the motor. The housing may comprise at least one channel formed in a surface of the housing. The antenna may comprise an electrical conductor. The at least one mounting bracket may be configured to support the roller tube such that the roller tube can rotate with respect to the at least one mounting bracket. The motorized window treatment may define a gap between the roller tube and the mounting bracket. The electrical conductor of the antenna may be wrapped around the housing of the motor drive unit adjacent to the gap between the roller tube and the mounting bracket. The electrical conductor of the antenna may be configured to be received within the at least one channel when wrapped around the housing.

The motor drive unit may comprise a wireless communication circuit that is electrically coupled to the antenna for transmitting and receiving wireless signals. The at least one channel may comprise at least two peripheral channels that extend parallel to each other around the circumference of the housing in an outer surface of the housing. The at least two peripheral channels may be joined together at a recess and the electrical conductor of the antenna may be configured to pass from one peripheral channel to another via the recess. Alternatively, the at least one channel may comprise a single spiral-shaped channel. The spiral-shaped channel may be configured such that the antenna moves away from the roller tube in the longitudinal direction as the antenna wraps around the housing.

The motor drive unit may comprise a motor drive printed circuit board on which drive circuitry for controlling the motor is mounted. The motor drive unit may comprise a battery compartment for receiving one or more batteries for powering the drive circuitry on the motor drive printed circuit board and the wireless communication circuit. The housing may comprise a cap for covering an end of the battery compartment. The battery compartment may be located between the cap and the motor drive printed circuit board. The electrical conductor of the antenna may be wrapped around the cap. The electrical conductor of the antenna may be located within the at least one channel that extends around the cap. The wireless communication circuit may be located inside the cap.

The motorized window treatment may comprise a matching network circuit that is coupled to the motor drive printed circuit board. The matching network circuit may be located inside the cap. The wireless communication circuit may be coupled to the motor drive printed circuit board via a ribbon cable. The motor drive unit may comprise a coupling printed circuit board located near the gap between the roller tube and the mounting bracket. The coupling printed circuit board may comprise a matching network circuit mounted thereto. The antenna may be electrically coupled to the mounting network circuit on the coupling printed circuit board. The wireless communication circuit may be mounted to the motor drive printed circuit board and electrically connected to the matching network circuit on the coupling printed circuit board by a coaxial cable.

The motorized window treatment may comprise a flexible printed circuit board. The antenna may be formed on the flexible printed circuit board. The motorized window treatment may comprise a bearing assembly coupled to the roller tube, such that the roller tube is configured to rotate around the motor drive unit. The bearing assembly may be located between the roller tube and the mounting bracket. The bearing assembly may be made of a non-conductive material. The antenna may be wrapped around the housing within an area that surrounds the circumference of the motor drive unit and falls within an area defined by the bearing assembly. At least a portion of the antenna may be aligned with the gap between the roller tube and the at least one mounting bracket. The gap between the roller tube and the at least one mounting bracket may define an area comprising non-conductive components. The roller tube may be made of a conductive material. The antenna may be configured to be electromagnetically coupled to the roller tube. The roller tube and the mounting bracket may both be made of conductive materials. The housing may comprise a body and a cap that is configured to attach to the body. The at least one channel may be defined in the body such that the antenna is wrapped around the body.

DETAILED DESCRIPTION

Figure 1:
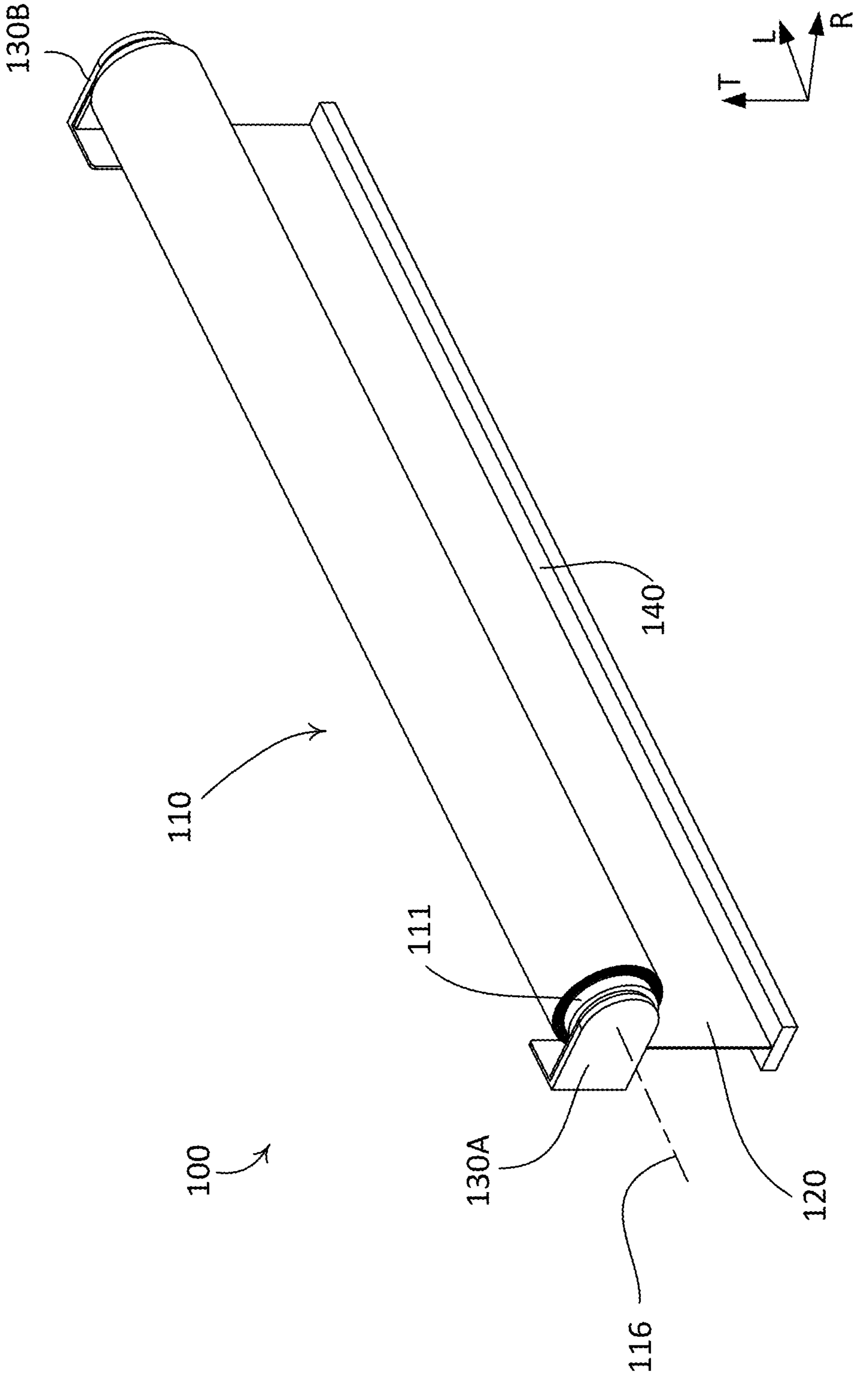
FIG. 1 is an example motorized window treatment.
Figure 2:
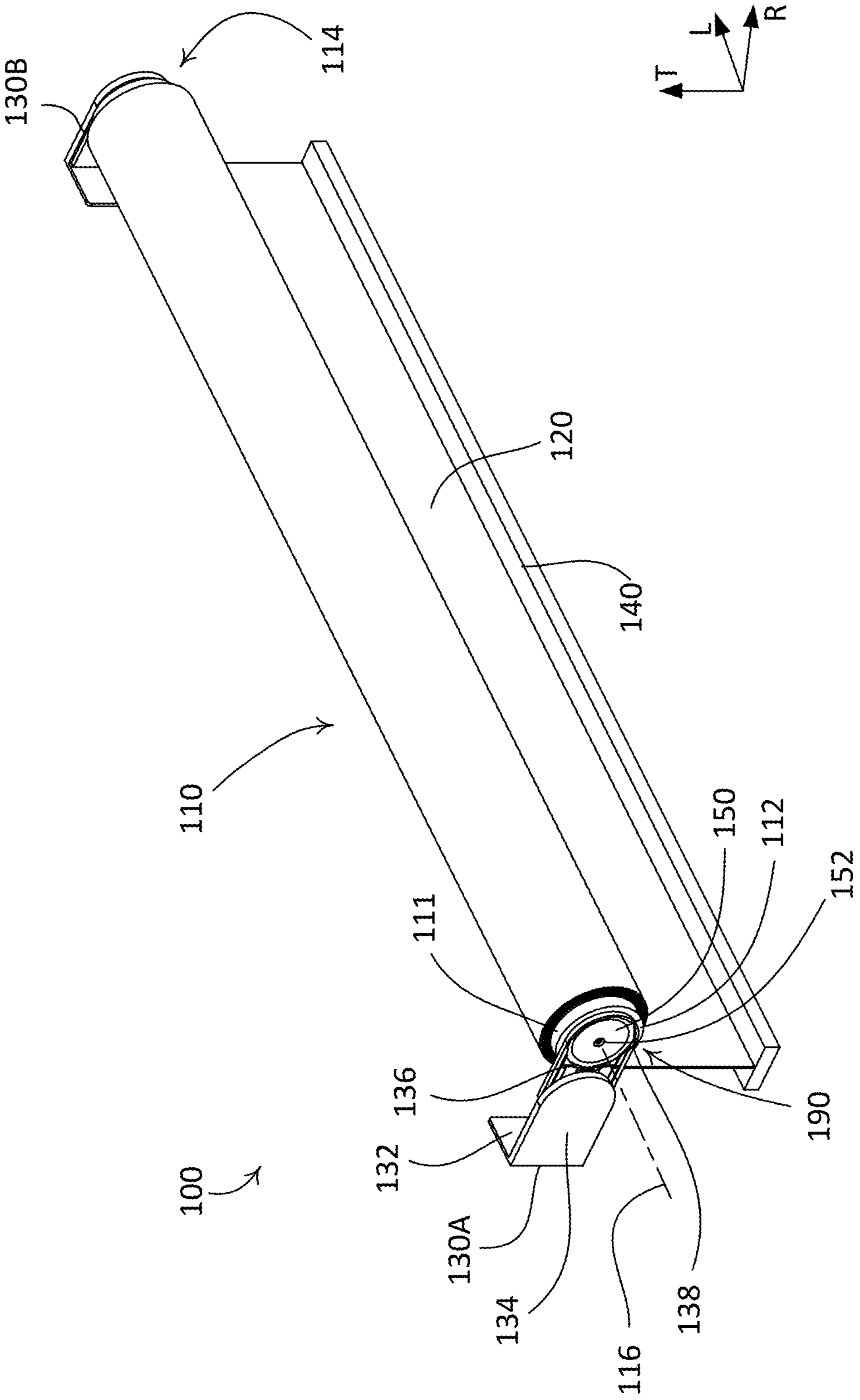
FIG. 2 is a perspective view of an example battery-powered motorized window treatment with one end of the roller tube in a pivoted position.

FIGS. 1 and 2 depict an example motorized window treatment 100 (e.g., a battery-powered motorized window treatment system) that includes a window treatment assembly 110 and one or more mounting brackets 130A, 130B. The window treatment assembly 110 may comprise a roller tube 111, a flexible material 120 (e.g., a covering material) windingly attached to the roller tube 111, a motor drive unit 190 installed inside of a first end 112 of the roller tube 111, and an idler (not shown) installed inside of a second end 114 of the roller tube 111. The mounting brackets 130A, 130B may be configured to be coupled to or otherwise mounted to a structure. For example, each of the mounting brackets 130A, 130B may be configured to be mounted to (e.g., attached to) a window frame (e.g., to a head jamb or side jambs of the window frame), a wall, a ceiling, or other structure, such that the motorized window treatment 100 is mounted proximate to an opening (e.g., over the opening or in the opening), such as a window for example. The mounting brackets 130A, 130B may be configured to be mounted to a vertical structure (e.g., wall-mounted to a wall as shown in FIG. 1) and/or mounted to a horizontal structure (e.g., ceiling-mounted to a ceiling). For example, the mounting brackets 130A, 130B may be rotated 90 degrees from what is shown in FIG. 1.

The roller tube 111 may operate as a rotational element of the motorized window treatment 100. The roller tube 111 may be elongate along a longitudinal direction L and rotatably mounted (e.g., rotatably supported) by the mounting brackets 130. The roller tube 111 may define a longitudinal axis 116. The longitudinal axis 116 may extend along the longitudinal direction L. The mounting bracket 130A may extend from the structure in a radial direction R, as shown in FIG. 1. It should be appreciated that when the mounting brackets 130A, 130B are ceiling-mounted, the mounting bracket 130A may extend from the structure in a transverse direction T. The radial direction R may be defined as a direction perpendicular to the structure and the longitudinal axis 116. The flexible material 120 may be windingly attached to the roller tube 111, such that rotation of the roller tube 111 causes the flexible material 120 to wind around or unwind from the roller tube 111 along a transverse direction T that extends perpendicular to the longitudinal direction L. For example, rotation of the roller tube 111 may cause the flexible material 120 to move between a fully-raised position (e.g., an open or fully-open position as shown in FIG. 1) and a fully-lowered position (e.g., a closed or fully-closed position) along the transverse direction T.

The roller tube 111 may be made of aluminum. The roller tube 111 may be a low-deflection roller tube and may be made of a material that has high strength and low density, such as carbon fiber. The roller tube 111 may have, for example, a diameter of approximately two inches. For example, the roller tube 111 may exhibit a deflection of less than ¼ of an inch when the flexible material 120 has a length of 12 feet and a width of 12 feet (e.g., and the roller tube 111 has a corresponding width of 12 feet and the diameter is two inches). Examples of low-deflection roller tubes are described in greater detail in U.S. Patent Application Publication No. 2016/0326801, published Nov. 10, 2016, entitled LOW-DEFLECTION ROLLER SHADE TUBE FOR LARGE OPENINGS, the entire disclosure of which is hereby incorporated by reference.

The flexible material 120 may include a first end (e.g., a top or upper end) that is coupled to the roller tube 111 and a second end (e.g., a bottom or lower end) that is coupled to a hembar 140. The hembar 140 may be configured, for example weighted, to cause the flexible material 120 to hang vertically. Rotation of the roller tube 111 may cause the hembar 140 to move toward or away from the roller tube 111 between the raised and lowered positions.

The flexible material 120 may be any suitable material, or form any combination of materials. For example, the flexible material 120 may be "scrim," woven cloth, non-woven material, light-control film, screen, and/or mesh. The motorized window treatment 100 may be any type of window treatment. For example, the motorized window treatment 100 may be a roller shade as illustrated, a soft sheer shade, a drapery, a cellular shade, a Roman shade, or a Venetian blind. As shown, the flexible material 120 may be a material suitable for use as a shade fabric, and may be alternatively referred to as a flexible material. The flexible material 120 is not limited to shade fabric. For example, in accordance with an alternative implementation of the motorized window treatment 100 as a retractable projection screen, the flexible material 120 may be a material suitable for displaying images projected onto the flexible material 120.

The motorized window treatment 100 may include a motor drive unit (e.g., a drive assembly) that may at least partially be disposed within the roller tube 111. For example, the motor drive unit may include a housing that is received within the roller tube 111. The motor drive unit may comprise a motor for rotating the roller tube 111 and a control circuit (e.g., that may include a microprocessor) for controlling the motor. The motor drive unit may be powered by a power source (e.g., an alternating-current or direct-current power source) provided by electrical wiring and/or batteries. The motor drive unit may be operably coupled to the roller tube 111 such that when the motor is controlled, the roller tube 111 rotates. The motor drive unit may be configured to rotate the roller tube 111 of the example motorized window treatment 100 such that the flexible material 120 is operable between the fully-raised position and the fully-lowered position. The motor drive unit may be configured to rotate the roller tube 111 while reducing noise generated by the motor drive unit (e.g., noise generated by one or more gear stages of the drive assembly). Examples of motor drive units for motorized window treatments are described in greater detail in commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, and U.S. Pat. No. 9,598,901, issued Mar. 21, 2017, entitled QUIET MOTORIZED WINDOW TREATMENT SYSTEM, the entire disclosures of which are hereby incorporated by reference.

The motorized window treatment 100 may be configured to enable access to one or more ends of the window treatment assembly 110 while remaining secured to the mounting brackets 130A, 130B. For example, the motorized window treatment 100 may be adjusted (e.g., pivoted or slid) between an operating position (e.g., as shown in FIG. 1) to an extended position (e.g., as shown in FIG. 2) while secured to the mounting brackets 130A, 130B. The operating position may be defined as a position in which the window treatment assembly 110 is supported by and aligned with both mounting brackets 130A, 130B. The extended position may be defined as a position in which one or more ends of the window treatment assembly 110 are accessible while still attached to the brackets 130A, 130B.

When in the extended position, the one or more ends of the window treatment assembly 110 may be accessed, for example, to replace batteries, adjust one or more settings, make an electrical connection, repair one or more components, and/or the like. One or more of the mounting brackets 130A, 130B may enable an end of the window treatment assembly 110 to be accessed when the motorized window treatment is in the extended position. For example, the first mounting bracket 130A may define a base 132 and an arm 134. The base 132 and the arm 134 may define a stationary portion of the mounting bracket 130. The mounting bracket 130A, 130B may define a translating portion 136. The translating portion 136 may include an attachment member 138 that is configured to receive the first end 112 of the window treatment assembly 110. The attachment member 138 may define an aperture. The base 132 may be configured to attach the mounting bracket 130A to a structure. When the mounting bracket 130A is attached to a vertical structure, such as a wall, the arm 134 of the mounting bracket 130A may extend horizontally (e.g., in the radial direction R) from the base 132.

One end of the window treatment assembly 110 may slide out when the motorized window treatment 100 is in the extended position. For example, one of the mounting brackets (e.g., the mounting bracket 130A) may be configured to slide out and the other one of the mounting brackets (e.g., the mounting bracket 130B) may remain stationary when the motorized window treatment 100 (e.g., the window treatment assembly 110) is in the extended position, for example, as shown in FIG. 2. The extended position of the motorized window treatment 100 may include the first end 112 of the window treatment assembly 110 proximate to a first mounting bracket (e.g., mounting bracket 130A) being further from a window and/or the structure to which the first mounting bracket is anchored than when the motorized window treatment 100 is in the operating position. The second end 114 (e.g., opposite the first end 112) of the window treatment assembly 110 proximate to the second mounting bracket (e.g., mounting bracket 130B) may remain substantially fixed when the motorized window treatment 100 is in the extended position, for example, as shown in FIG. 2. Stated differently, the window treatment assembly 110 may pivot between the operating position and the extended position. The second end 114 of the window treatment assembly 110 and the mounting bracket 130B may define a fulcrum about which the motorized window treatment 100 (e.g., the roller tube 111) pivots.

When the motorized window treatment 100 is in the extended position, a motor drive unit housing end 150 may be exposed (e.g., accessible). The motor drive unit housing end 150 may be located proximate to the first end 112 of the window treatment assembly 110. The motor drive unit housing end 150 may cover a cavity of the roller tube 111. The motor drive unit housing end 150 may be configured to be removably secured to the roller tube 111 (e.g., at the first end 112 of the window treatment assembly 110). For example, the motor drive unit housing end 150 may be configured to be secured within the cavity. The motor drive unit housing end 150 may be configured to retain one or more components (e.g., such as the batteries 260 shown in FIG. 3).

The motor drive unit housing end 150 may include a control button 152. The control button 152 may be backlit. For example, the control button 152 may include a light pipe (e.g., may be translucent or transparent) that is illuminated by a light emitting diode (LED) within the motor drive unit housing. The control button 152 may be configured to enable a user to change one or more settings of the motorized window treatment 100. For example, the control button 152 may be configured to change one or more wireless communication settings and/or one or more drive settings. The control button 152 may be configured to enable a user to pair the motorized window treatment 100 with a remote control device to allow for wireless communication between the remote control device and a wireless communication circuit (e.g., an RF transceiver) of the motor drive unit 190. The control button 152 may be configured to provide a status indication to a user. For example, the control button 152 may be configured to flash and/or change colors to provide the status indication to the user. The status indication may indicate when the motorized window treatment 100 is in a programming mode.

The motor drive unit housing end 150 may include a disable actuator 154 for detecting when the roller tube 111 is not in the operating position. The motor drive unit (e.g., the drive assembly) may be deactivated (e.g., automatically deactivated) when the roller tube 111 is not in the operating position. For example, the disable actuator 154 may be configured to disable the motor drive unit such that the covering material cannot be raised or lowered when the roller tube 111 is not in the operating position. The disable actuator 154 may disable a motor of the motor drive unit, for example, when the roller tube 111 is pivoted (e.g., or slid) from the operating position to the extended position. The disable actuator 154 may enable the motor when the roller tube 111 reaches the operating position. For example, the disable actuator 154 may be a button, a switch, and/or the like.

In addition, the motor drive unit housing end 150 may also comprise a position detect circuit (not shown) for detecting when the roller tube 111 is not in the operating position and deactivating (e.g., automatically deactivating) the drive assembly (e.g., rather than including the disable actuator 154). For example, the position detect circuit may comprise a magnetic sensing circuit (e.g., a Hall-effect sensor circuit) configured to detect when the motor drive unit housing end 150 is in the extended position and not in close proximity to a magnet located inside of the mounting bracket 130A. The position detect circuit may be configured to disable the drive assembly such that the covering material cannot be raised or lowered when the roller tube 111 is not in the operating position. The position detect circuit may disable a motor of the drive assembly, for example, when the roller tube 111 is pivoted (e.g., or slid) from the operating position to the extended position. The position detect circuit may enable the motor when the roller tube 111 reaches the operating position. For example, the position detect circuit may also comprise an IR sensor, a switch, and/or the like.

Figure 3:
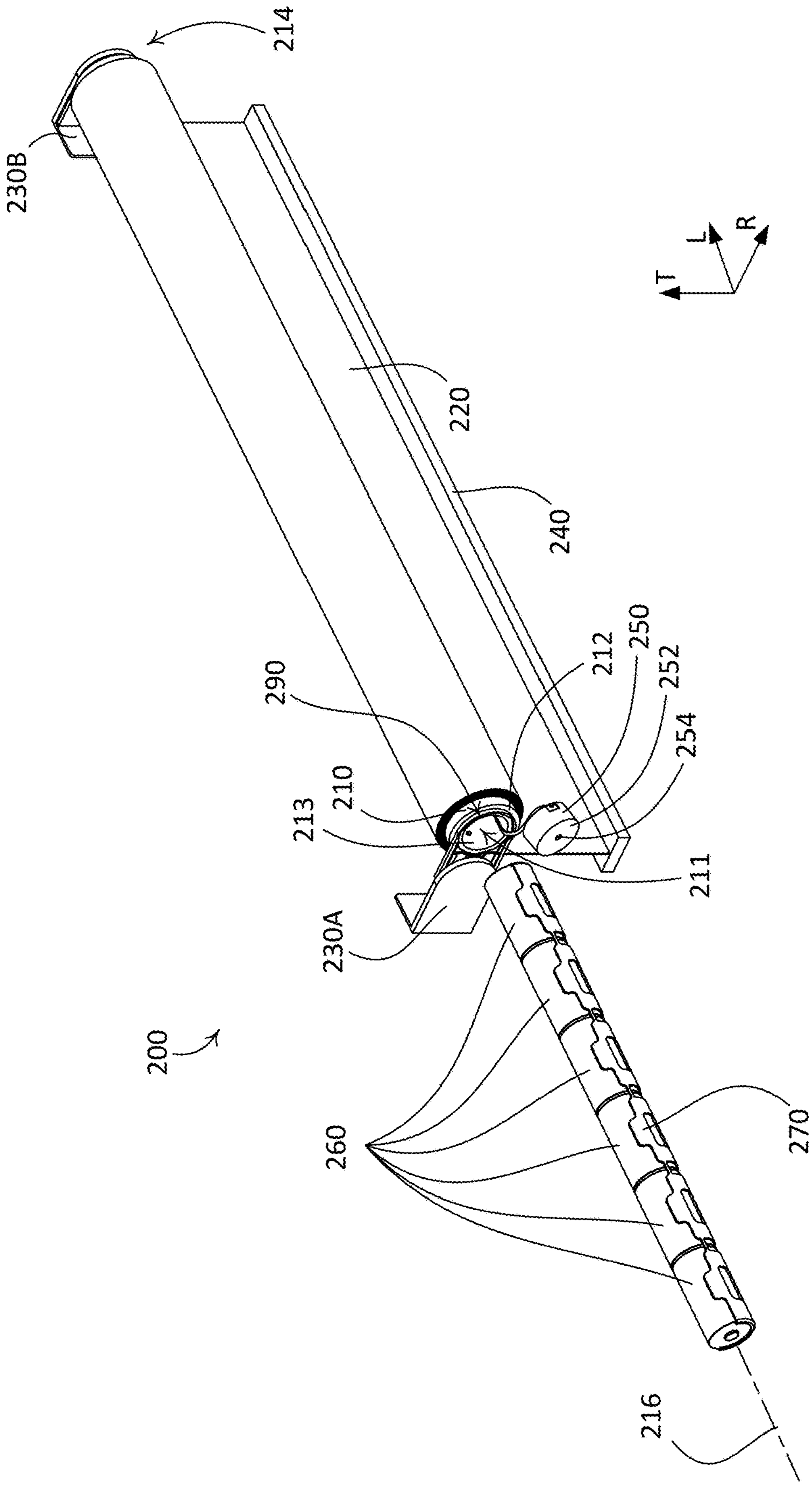
FIG. 3 is a perspective view of another example battery-powered motorized window treatment shown with batteries removed.

FIG. 3 depicts an example battery-powered motorized window treatment 200 (e.g., such as the motorized window treatment 100 shown in FIGS. 1 and 2). The battery-powered motorized window treatment 200 may include a roller tube 210 (e.g., such the roller tube 111 shown in FIG. 1), a flexible material 220 (e.g., a covering material) windingly attached to the roller tube 210, a motor drive unit 290 (e.g., a drive assembly), and a plurality of batteries 260. The battery-powered motorized window treatment 200 may further include a hembar 240 (e.g., such as the hembar 140 shown in FIGS. 1 and 2) and one or more mounting brackets 230A, 230B (e.g., such as the mounting brackets 130A, 130B shown in FIGS. 1 and 2). The motor drive unit 290 of the battery-powered motorized window treatment 200 may be powered by the batteries 260. Although the battery-powered motorized window treatment 200 is shown with four batteries 260, it should be appreciated that the battery-powered motorized window treatment 200 may include a greater or smaller number of batteries. The roller tube 210 may define a longitudinal axis 216. The longitudinal axis 216 may extend along a longitudinal direction L.

The motor drive unit may comprise a housing 292 in which the batteries 260 may be housed. The housing 292 of the motor drive unit 290 may comprise a cap 250 that is configured to retain the batteries 260 within the housing 292 of the motor drive unit 290 (e.g., within the roller tube 210). The cap 250 may define an outer surface 252 with a button 254 (e.g., such as button 152. The button 254 may be backlit. For example, the button 254 may include a light pipe that is illuminated by an LED within the cap 250. The button 254 may be configured to enable a user to change one or more settings of the battery-powered motorized window treatment 200 as similarly described with button 152. The button 254 may be configured to enable a user to pair the battery-powered motorized window treatment 200 with a remote control device to allow for wireless communication between the remote control device and a wireless communication circuit of the motor drive unit 290. The button 254 may be configured to provide a status indication to a user. For example, the button 254 may be configured to flash and/or change colors to provide the status indication to the user. The button 254 may indicate when the battery-powered motorized window treatment 200 is in a programming mode, for example, via the status indication.

The motor drive unit 290 may be at least partially received within the roller tube 210. For example, the housing 292 of the motor drive unit 290 may define a battery compartment 211 (e.g., a cavity) that is configured to receive the batteries 260 of the motor drive unit 290. The battery compartment 211 may be accessible when the battery-powered motorized window treatment 200 is in the extended position (e.g., pivoted) and the cap 250 is removed.

The motor drive unit 290 of the battery-powered motorized window treatment 200 may include a battery holder 270. The battery holder 270 may be configured to keep the batteries 260 fixed in place securely while the batteries 260 are providing power to the motor drive unit 290. The batteries 260 and the battery holder 270 may be configured to be removed from the battery compartment 211 of the housing 292 along the longitudinal axis 216 of the roller tube 210. For example, the cap 250 may be removed (e.g., disengaged from the roller tube 210 and/or the housing 292 of the motor drive unit 290) such that the batteries 260 and battery holder 270 can be accessed. The battery holder 270 may be configured to be translated (e.g., along the longitudinal axis 216 of the roller tube 210) until it is removed from the housing 292. The batteries 260 may remain within the battery holder 270 of the motor drive unit 290 when the battery holder 270 is removed from the battery compartment 211. The batteries 260 may be removed from the battery holder 270 when it is removed from the battery compartment 211 of the housing 292. Replacement batteries may be installed within the battery holder 270 while it is removed from the battery compartment 211 of the housing 292. The battery holder 270 may be open at opposed ends, for example, such that the batteries 260 can be electrically connected to a printed circuit board of the motor drive unit 290. For example, one of the batteries 260 (e.g., the battery distal from the end 213 of the roller tube 210 when the battery holder 270 is installed within the battery compartment 211 of the housing 292) may be configured to abut a spring (e.g., such as spring 384 shown in FIG. 4) within the housing 292 of the motor drive unit 290. And, one of the batteries 260 (e.g., the battery proximate to the end 213 of the roller tube 210 when the battery holder 270 is installed within the battery compartment 211 of the housing 292) may be configured to abut an electrical contact (e.g., the electrical contact 356 shown in FIG. 4) within the cap 250.

Figure 4:
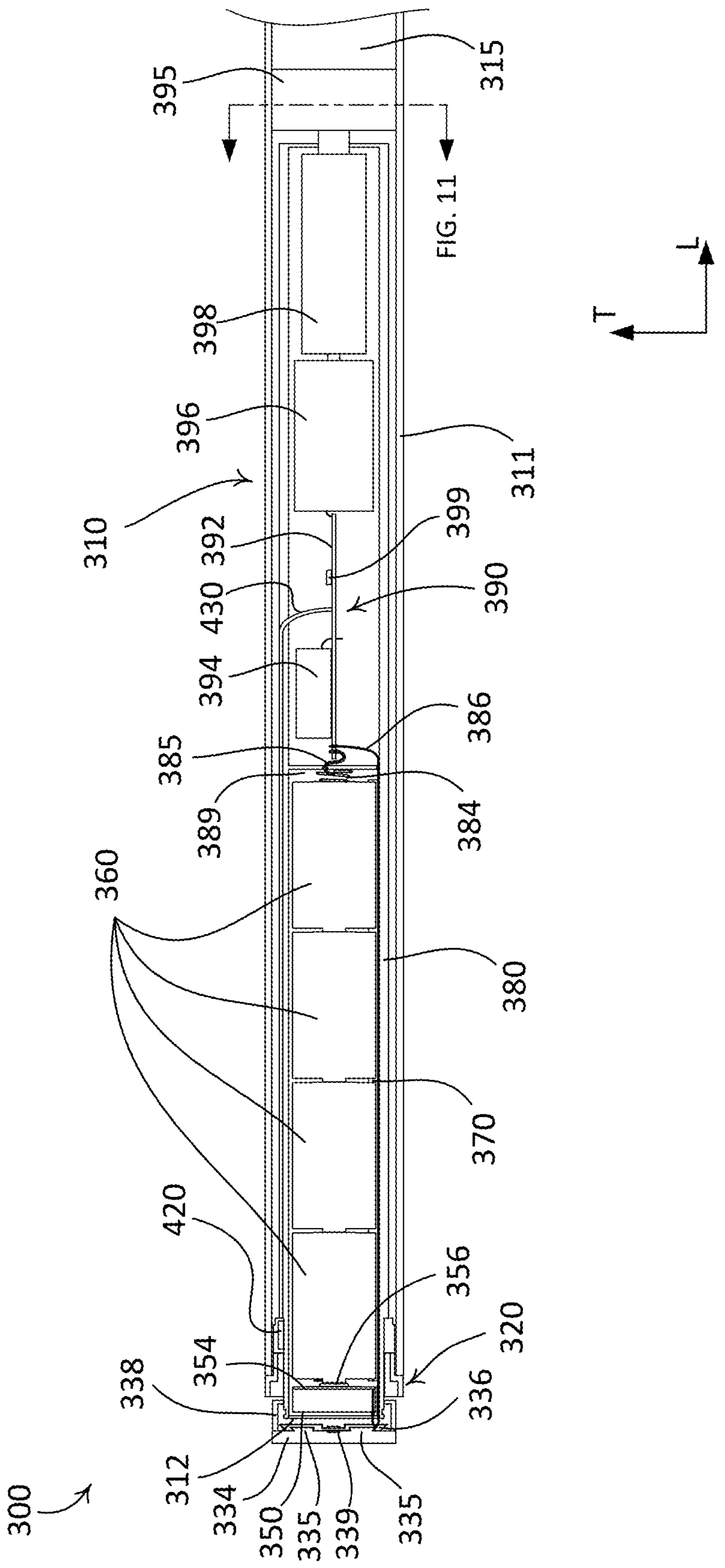
FIG. 4 is a front cross-sectional view of an example motorized window treatment.
Figure 5:
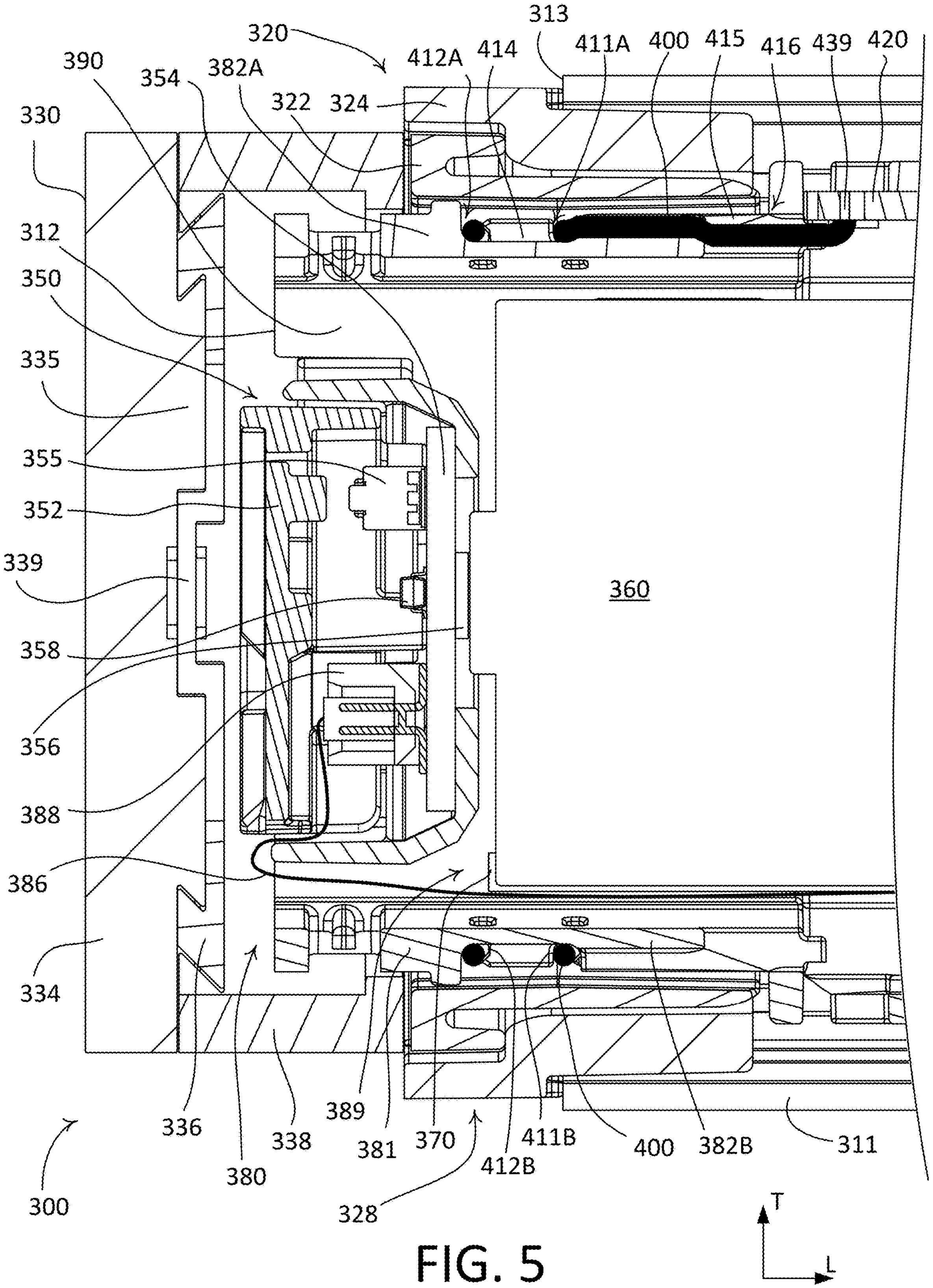
FIG. 5 is an enlarged front cross-sectional view of the motorized window treatment of FIG. 4.

FIGS. 4 and 5 depict an example motorized window treatment 300 (e.g., such as the motorized window treatment 100 shown in FIGS. 1 and 2, and/or the battery-powered motorized window treatment 200 shown in FIG. 3). FIG. 4 is a front cross-sectional view and FIG. 5 is an enlarged front cross-sectional view of the motorized window treatment

300. The motorized window treatment 300 may include a window treatment assembly 310 having a roller tube 311 and a motor drive unit 390. The roller tube 311 may be made from a conductive material, such as aluminum or other suitable metal. The motor drive unit 390 may be powered by one or more batteries 360. Although not shown in FIGS. 4-5, the window treatment assembly may also comprise a flexible material windingly attached to the roller tube 311 (e.g., such as the flexible material 120, 220) and an idler (e.g., such as the idler of the motorized window treatments 100, 200). The motorized window treatment 300 may also comprise one or more mounting brackets for mounting the motorized window treatment 300 to a structure, such as a first mounting bracket 330 (e.g., the first mounting bracket 130A, 230A) for supporting the motor drive unit 390 and a second mounting bracket (e.g., the second mounting bracket 130B, 230B) for supporting the idler. The first mounting bracket 330 and the second mounting bracket may be made from a conductive material, such as aluminum or other suitable metal. In addition, the first mounting bracket 330 and the second mounting bracket may be made from a non-conductive material, such as plastic.

The motorized window treatment 300 may be adjusted between an operating position (e.g., as shown in FIGS. 1, 4, and 5) to an extended position (e.g., as shown in FIGS. 2 and 3) while secured to the first mounting bracket 330 and the second mounting bracket. The operating position may be defined as a position in which the roller tube assembly 310 is supported by and aligned with the first mounting bracket 330 and the second mounting bracket (e.g., as shown in FIG. 1). The motorized window treatment 300 may be configured to be operated between the operating position and an extended position, for example, to enable access to replace the batteries 360. The extended position may be defined as a position in which a first end 312 of the roller tube assembly 310 is accessible while still attached to the first mounting bracket 330. The extended position may define a pivoted position, for example, as shown in FIGS. 2 and 3, where one of the first mounting bracket 330 extends such that the batteries 360 are accessible via the first end 312 of the roller tube assembly 310.

The first mounting bracket 330 and the second mounting bracket may be configured to attach the motorized window treatment 300 to a structure. The first mounting bracket 330 may define a base (e.g., such as the base 132) and an arm 334. The base and the arm 334 may define a stationary portion of the first mounting bracket 330. The first mounting bracket 330 may define a translating portion 336. The translating portion 336 may include an attachment member 338 that is configured to receive an end of the window treatment assembly 310. For example, the attachment member 338 of the mounting bracket 330 may be configured to receive the motor drive unit 390. The attachment member 338 may define an aperture. The base may be configured to attach the first mounting bracket 330 to a structure. The structure may include a window frame (e.g., a head jamb or side jambs of a window frame), a wall, a ceiling, or other structure, such that the motorized window treatment 300 is mounted proximate to an opening (e.g., over the opening or in the opening), such as a window for example. When the first mounting bracket 330 is attached to a vertical structure, such as a wall, the arm 334 of the mounting bracket 330 may extend horizontally from the base.

The translating portion 336 may be configured to translate the window treatment assembly 310 between the operating position (e.g., as shown in FIG. 1) and the extended position (e.g., as shown in FIG. 2). The translating portion 336 may be proximate to the base when in the operating position and distal from the base when in the extended position. The first end 312 of the roller tube assembly 310 (e.g., an end of the motor drive unit 390) may be accessible via the aperture (e.g., to replace the batteries 360) when the translating portion 336 is in the extended position.

The arm 334 may define one or more features that enable the translating portion 336 to be translated between the operating position and the extended position while remaining attached thereto. The translating portion 336 may define one or more corresponding features that are configured to cooperate with the one or more features on the arm 334. The arm 334 may define one or more slides 335 (e.g., an upper slide and a lower slide). The slides 335 may protrude from an inner surface of the arm 334. The translating portion 336 may define one or more channels (e.g., an upper channel and a lower channel) that are configured to receive the slides 335. The translating portion 336 may define a middle slide 339, for example, between the channels. The arm 334 may define a channel (e.g., a middle channel) that is configured to receive the middle slide 339. The slides 335, 339 and the channels may define angled edges (e.g., tapered edges) such that the attachment of the translating position 336 to the arm 334 defines an interlocking slide, e.g., such as a dovetail slide. The translating portion 336 may translate along the slides 335 between the operating position and the extended position.

Figure 6:
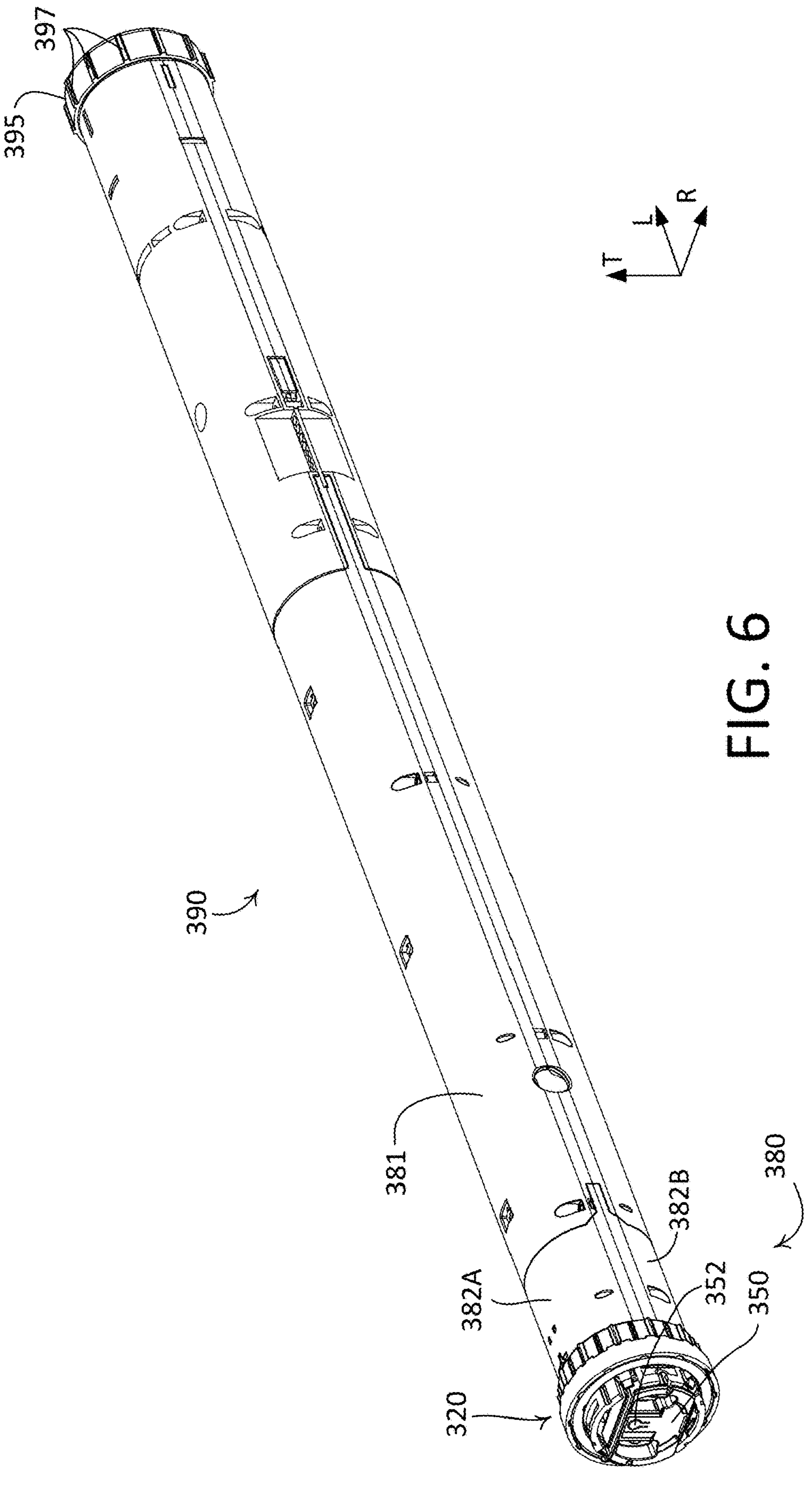
FIG. 6 is a perspective view of an example motor drive unit of a motorized window treatment, such as the example motorized window treatment of FIG. 4.
Figure 7:
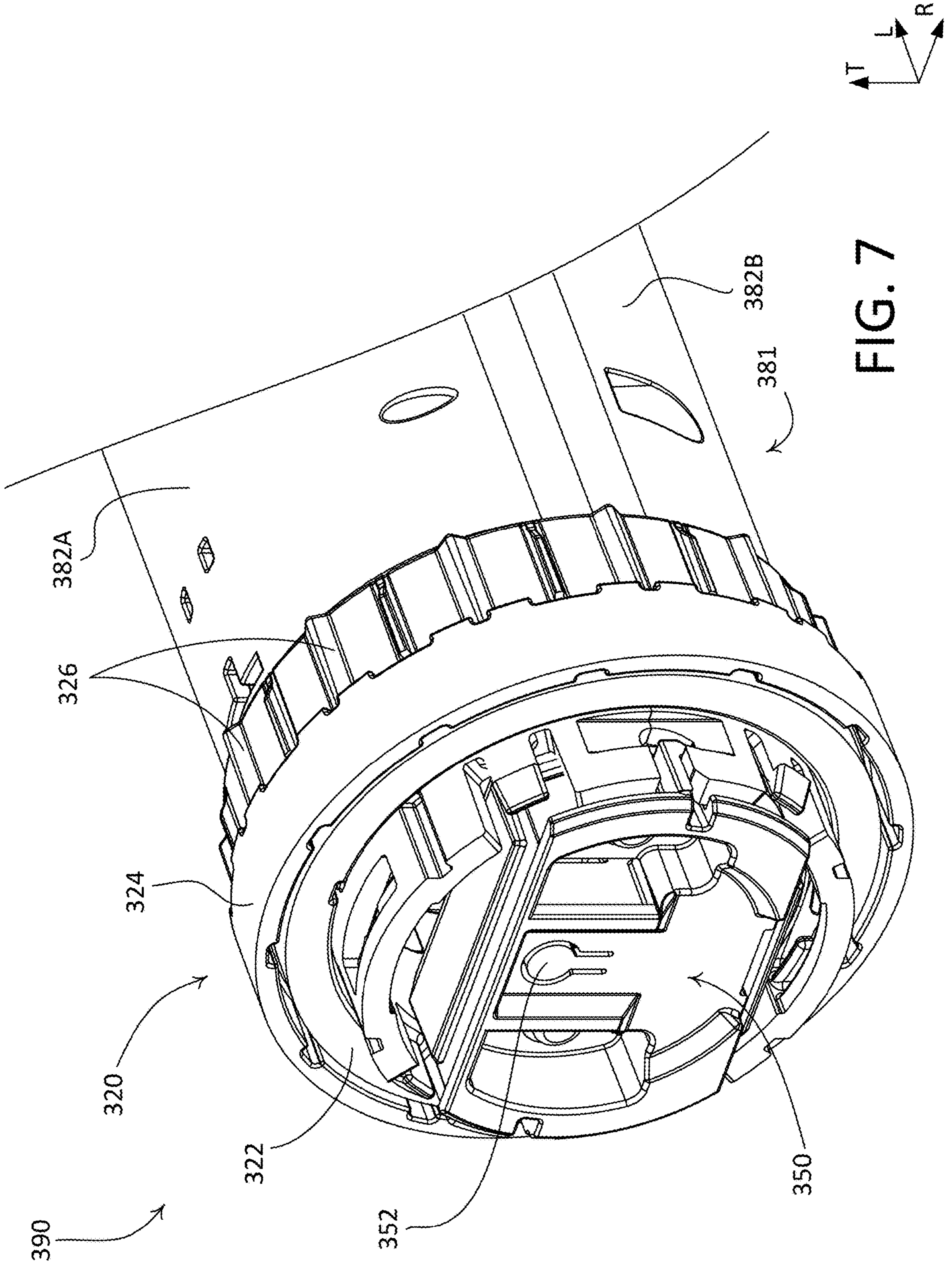
FIG. 7 is an enlarged perspective view of an end portion of the example motor drive unit of FIG. 6.

FIG. 6 is a perspective view of the motor drive unit 390 and FIG. 7 is an enlarged perspective view of an end portion of the motor drive unit 390. The motor drive unit 390 may comprise a housing 380. The housing 380 may comprise a body 381 and a cap 350 (e.g., the cap 250). The body 381 may be cylindrical. The cap 350 may be configured to attach to the body 381. The housing 380 may comprise an upper portion 382A and a lower portion 382B. The motor drive unit 390 may be operatively coupled to the roller tube 311, for example, via a coupler 395 (e.g., a drive coupler). The coupler 395 may be an output gear that is driven by a motor 396 and transfers rotation of the motor 396 to the roller tube 311. For example, the coupler 395 may define a plurality of splines 397 about its periphery. An inner surface of the roller tube 311 may be grooved. That is, the inner surface of the roller tube 311 may define a plurality of grooves (not shown). The splines 397 of the coupler 395 may be configured to engage respective groove in the roller tube 311 such that rotation of the motor 396 is transferred to the roller tube 310, for example, via the coupler 395.

Figure 8:
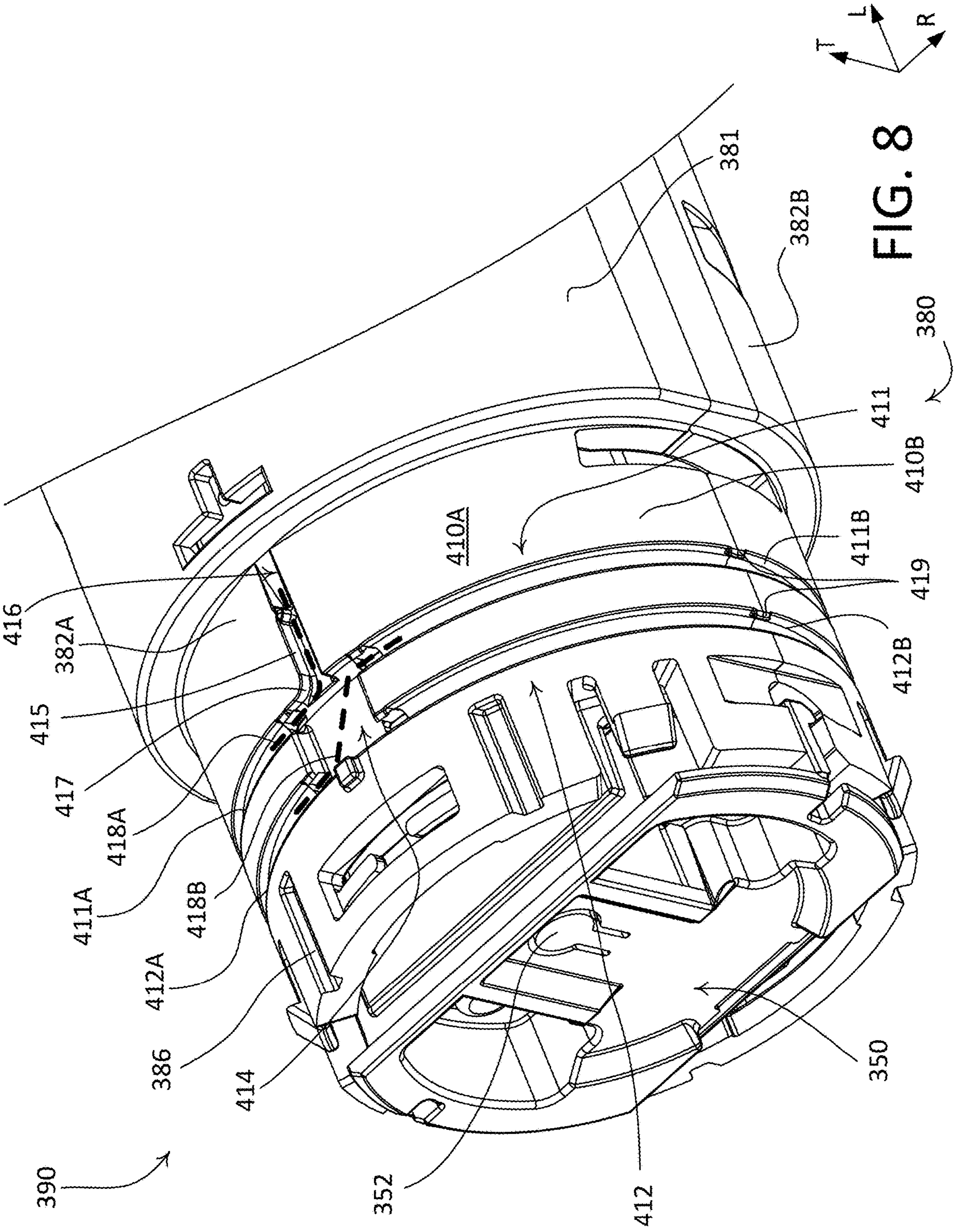
FIG. 8 is an enlarged perspective view of the end portion of the example motor drive unit of FIG. 6 with a bearing assembly removed.

The motorized window treatment 300 (e.g., the motor drive unit 390) may include a bearing assembly 320 having an inner bearing 322 and an outer bearing 324 that are located external to the roller tube 311. The inner bearing 322 and the outer bearing 324 may be non-metallic (e.g., plastic) sleeve bearings. The bearing assembly 320 may be captured between the roller tube 311 and the mounting bracket 330, such that the bearing assembly 320 may be located in a gap 328 (e.g., longitudinal gap) between the roller tube 311 and the mounting bracket 330. The components of the motorized window treatment 300 in and/or adjacent to the gap 328 may be non-conductive such that radio-frequency field disruption and/or shielding is minimized. For example, the motorized window treatment 300 may not include conductive (e.g., metal) components in an area radially surrounding the gap 328. The inner bearing 322 may engage the housing 380 of the motor drive unit 390. The inner bearing 322 may be operatively coupled to the motor drive unit housing 380. FIG. 8 is an enlarged perspective view of the end portion of the motor drive unit 390 with the bearing assembly 320 removed. For example, the inner bearing 322 may define splines (not shown) that are configured to be received by grooves 386 around the periphery of the housing 380 of the motor drive unit 390. The inner bearing 322 may be press fit onto the housing 380 of the motor drive unit 390. The outer bearing 324 may engage the roller tube 311. The outer bearing 324 may be operatively coupled to the roller tube 311. The outer bearing 324 may rotate with the roller tube 311. The outer bearing 324 may be press fit into engagement with the roller tube 311. For example, the outer bearing 324 may comprise a plurality of splines 326 that are configured to engage grooves (not shown) of the roller tube 311. The inner bearing 322 may remain stationary with the motor drive unit housing 380 as the roller tube 311 rotates. Stated differently, the roller tube 311 and the outer bearing 324 may rotate about the inner bearing 322 and the housing 380 of the motor drive unit 390.

The motor drive unit 390 may include a battery holder 370 (e.g., the battery holder 270). The battery holder 370 and the cap 350 may keep the batteries 360 fixed in place securely while the batteries 360 are providing power to the motor drive unit 390 and/or the cap 350. The battery holder 370 may be configured to clamp the batteries 360 together (e.g., as shown in FIG. 3) such that the batteries 360 can be removed from the motorized window treatment 300 at the same time (e.g., together). The battery holder 370 may be received in a motor drive unit cavity 389 of the motor drive unit 390. The motor drive unit 390 may be received within a roller tube cavity 315 (FIG. 4). The roller tube cavity 315 may be open proximate to an end 313 of the roller tube 311 (e.g., the first end 312 of the window treatment assembly 310). The batteries 360 may be configured to be removed from the motor drive unit 390, for example, while the housing 380 of the motor drive unit 390 remains engaged with the first mounting bracket 330 and the second mounting bracket. That is, the batteries 360 may be configured to be removed from the motor drive unit 390 when the motorized window treatment 300 is in the pivoted position. An inside diameter of the inner bearing 322 may be greater than an outer diameter of the batteries 360 and/or the battery holder 370.

The cap 350 may be configured to cover an end of the motor drive unit cavity 389. For example, the cap 350 may be received (e.g., at least partially) within the motor drive unit cavity 389. The cap 350 may include a button 352, a control interface printed circuit board 354, and an electrical contact 356 (e.g., a conductive pad) electrically coupled to the control interface printed circuit board 354. The electrical contact 356 may be a positive electrical contact, for example, as shown in FIG. 5. Alternatively, the electrical contact 356 may be a negative electrical contact. The cap 350 may include a switch 355 (e.g., a mechanical tactile switch) mounted to the control interface printed circuit board 354 and configured to be actuated in response to actuations of the button 352. The button 352 may be illuminated by a light-emitting diode (LED) 358 mounted to the control interface printed circuit board 354.

The motor drive unit 390 may include a motor drive printed circuit board 392, an intermediate storage device 394, and a gear assembly 398. The intermediate storage device 394 may include one or more capacitors (e.g., super capacitors) and/or one or more rechargeable batteries. The batteries 360 may be located between the cap 350 and the motor drive printed circuit board 392 of the motor drive unit 390. The motor drive unit 390 may also comprise a motor drive circuit (e.g., such as the motor drive circuit 820 shown in FIG. 16) for driving the motor 396, a control circuit (e.g., such as the control circuit 830 shown in FIG. 16) for controlling the motor drive circuit, and/or, a wireless communication circuit 399 (e.g., such as the communication circuit 842 shown in FIG. 16) mounted to the motor drive printed circuit board 392.

The motor drive unit 390 may include a spring 384, which may extend from an internal wall of the motor drive unit cavity 389. The spring 384 may be configured to abut and apply a force to one of the batteries 360, for example, such that the batteries 360 remain in contact with one another while installed within the motor drive unit cavity 389. The spring 384 may be electrically coupled to the motor drive printed circuit board 392 via a wire 385. The spring 384 may be a negative electrical contact, for example, as shown in FIG. 4. Alternatively, the spring 384 may be a positive electrical contact. The spring 384 may be configured to apply a force to the batteries 360 to maintain electrical connection of the batteries 360 with the spring 384 and the electrical contact 356 of the cap 350.

The button 352 may be configured to enable a user to change one or more settings of the motorized window treatment 300. For example, the button 352 may be configured to change one or more settings of the control interface printed circuit board 354 and/or the motor drive printed circuit board 392. The button 352 may be configured to enable a user to pair the motorized window treatment 300 with a remote control device to allow for wireless communication between the remote control device and the wireless communication circuit 399 mounted to the motor drive printed circuit board 392. The button 352 may be configured to provide a status indication to a user. For example, the control button 352 may be configured to flash and/or change colors to provide the status indication to the user. The button 352 may be configured to indicate (e.g., via the status indication) whether the motor drive unit 390 is in a programming mode.

The control interface printed circuit board 354 and the motor drive printed circuit board 392 may be electrically connected. For example, the motorized window treatment 300 may include a ribbon cable 386. The ribbon cable 386 may be attached to a connector 388 mounted to the control interface printed circuit board 354 and a similar connector mounted to the motor drive printed circuit board 392. The ribbon cable 386 may be configured to electrically connect the control interface printed circuit board 354 and the motor drive printed circuit board 392. The ribbon cable 386 may terminate at the control interface printed circuit board 354 and the motor printed circuit board 392. For example, the ribbon cable 386 may extend within the motor drive unit cavity 389. The ribbon cable 386 may include electrical conductors for providing power from the batteries 360 to the control interface printed circuit board 354 and/or the motor drive printed circuit board 392. The ribbon cable 386 may include electrical conductors for conducting control signals (e.g., for transmitting one or more messages) between the control interface printed circuit board 354 and the motor drive printed circuit board 392. For example, the ribbon cable 386 may be configured to conduct power and/or control signals between the control interface printed circuit board 354 and the motor drive printed circuit board 392.

The motor drive unit 390 may further comprise an antenna 400 (e.g., as shown in FIG. 5). For example, the antenna 400 may comprise an insulated electrical conductor, such as a 22-gauge stranded electrical wire with a polyvinyl chloride (PVC) coating. The antenna 400 may be wrapped around (e.g., wound about) the body 381 of the housing 380. The antenna 400 may be located in one or more channels, such as first and second peripheral (e.g., circumferential) channels 411, 412, in the housing 380 of the motor drive unit 390. The first peripheral channel 411 may comprise a first portion 411A formed in an outer surface 410A of the upper portion 382A of the housing 380 and a second portion 411B formed in an outer surface 410B of the lower portion 382B of the housing 380. The second peripheral channel 412 may comprise a first portion 412A formed in the outer surface 410A of the upper portion 382A of the housing 380 and a second portion 412B formed in the outer surface 410B of the lower portion 382B of the housing 380. The first and second peripheral channels 411, 412 may extend around the circumference of the housing 380 of the motor drive unit 390, such that the antenna 400 may be wrapped around the motor drive unit 390.

As shown in FIG. 5, the antenna 400 may be wrapped around the housing 380 of the motor drive unit 390 adjacent to the end 313 of the roller tube 311. For example, the antenna 400 may be wrapped around the housing 380 of the motor drive unit 390 below the bearing assembly 320, e.g., such that the antenna 400 is located within an area that surrounds the circumference of the motor drive unit and falls within an area defined by the bearing assembly 320. The antenna 400 may be wrapped around the motor drive unit 390 adjacent to the gap 328 between the roller tube 311 and the mounting bracket 330 (e.g., lie at least partially within the area defined by the gap). For example, the antenna 400 may be aligned with the gap 328. The antenna 400 may transmit and/or receive RF signals through the gap 328. In addition, when the antenna 400 is emitting electromagnetic waves, the electromagnetic waves may be coupled to the roller tube 311 (e.g., capacitively coupled to the roller tube), which may result in current flow (e.g., standing waves) on the surface of the roller tube 611 (e.g., since the roller tube 311 is made from a conductive material). As a result, the roller tube 311 may re-radiate the electromagnetic waves emitted by the antenna 400, which may increase the amount of RF signals transmitted and/or received by the antenna 400.

A distance (e.g., in the longitudinal direction L) between windings of the antenna 400 may be configured to prevent the antenna 400 from coupling to itself. For example, the distance between adjacent windings of the antenna 400 in the first peripheral channel 411 and the second peripheral channel 412 may be approximately 0.1 to 0.4 inches (e.g., such as 0.2 inches). The first peripheral channel 411 may be located closer to the roller tube 311 than the second peripheral channel 412. For example, the first peripheral channel 411 may be close to an outer edge of the roller tube 311 and partially underneath of the roller tube 311 (e.g., but not fully underneath of the roller tube 311) as shown in FIG. 5. For example, the second peripheral channel 412 may be located as far away from the first peripheral channel 411 as possible, but not underneath or within the attachment portion 338 of the mounting bracket 330. A center of the first peripheral channel 411 may be, for example, approximately 0.20 inches away from a center of the second peripheral channel 412. The first and second portions 382A, 382B of the housing 380 may be identical, such that two separate types of unique housing parts are not required to form the housing 380 of the motor drive unit 390. Since only one type of housing portion is required to form the housing 380, a manufacturer of the motor drive unit 390 is able to stock less parts in inventory.

Figure 9:
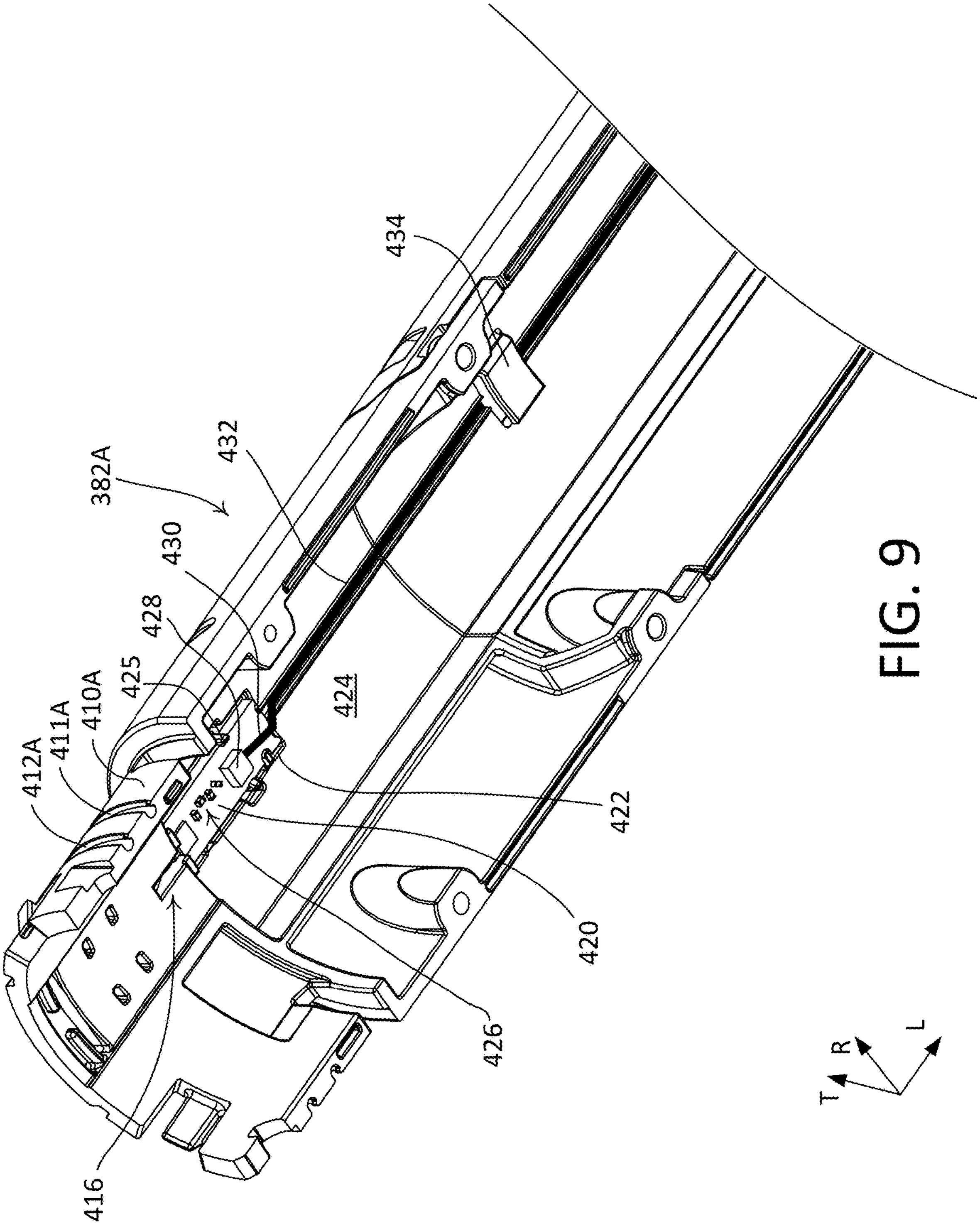
FIG. 9 is a partial exploded view of the motor drive unit of FIG. 6 looking up into the inside of an upper portion of a housing of the motor drive unit.

FIG. 9 is a partial exploded view of the motor drive unit 390 looking up into the inside of the upper portion 382A of the housing 380. The motor drive unit 390 may comprise a coupling printed circuit board 420 for coupling the antenna 400 to the wireless communication circuit 399 mounted to the motor drive printed circuit board 392. The coupling printed circuit board 420 may be received in a recess 422 in an inner surface 424 of the upper portion 382A of the housing 380. For example, the coupling printed circuit board 420 may be held in the recess 422 by one or more snaps 425. The coupling printing circuit board 420 may have a matching network circuit 426 mounted thereto. The matching network circuit 426 may be electrically coupled between the antenna 400 and the wireless communication circuit 399 mounted to the motor drive printed circuit board 392. The matching network circuit 426 may be electrically coupled to the wireless communication circuit 399 on the motor drive printed circuit board 392 via a coaxial cable 430, which may be electrically coupled to the coupling printed circuit board 420 via a coaxial connector 428. The matching network circuit 426 may be configured to optimize the performance of the antenna 400. For example, the matching network circuit 426 may be configured to match an impedance of the antenna 400 to an impedance of the wireless communication circuit 399 to obtain a maximum transfer of power between the antenna 400 and the wireless communication circuit 399. The matching network circuit 426 may include, for example, an inductor-capacitor (LC) filter. The coaxial cable 430 may extend through a coaxial cable channel 432 formed in the inner surface 424 of the upper portion 382A of the housing 380 and may be held in place by one or more tabs 434. The coaxial cable channel 432 may extend in the longitudinal direction L of the motorized window treatment 300. In addition, the wireless communication circuit 399 may be mounted to the coupling printed circuit board 420 and the wireless communication circuit 399 may be coupled to the circuitry on the motor drive printed circuit board 392 via a cable, such as a ribbon cable (e.g., like the ribbon cable 386).

As shown in FIG. 5, the antenna 400 may terminate at the coupling printed circuit board 430. For example, the antenna 400 may be received through a through-hole 439 in the coupling printed circuit board 430 and be soldered to an electrical pad surrounding the through-hole 439 to electrically couple the antenna 400 to the matching network circuit 436. The antenna 400 may extend from the first peripheral channel 411 (e.g., the first portion 411A in the outer surface 411A of the upper portion 382A of the housing 380) through an intermediate channel 415 and an opening 416 to the coupling printed circuit board 430. The intermediate channel 415 may also be formed in the outer surface 410A of the upper portion 382A of the housing 380 and may extend in the longitudinal direction L of the motorized window treatment 300. The first and second peripheral channels 411, 412 and the intermediate channel 415 may meet (e.g., intersect) at a recess 414, which may also be formed in the outer surface 411A of the upper portion 382A of the housing 380.

As the antenna 400 exits the intermediate channel 415 from coupling printed circuit board 430 and enters the recess 414, the electrical wire of the antenna 400 may follow a first path 418A to extend along the first peripheral channel 411. A corner 417 adjacent to the antenna 400 in the recess 414 may be rounded to facilitate bending of the electrical wire of the antenna 400. The antenna 400 may extend through the first peripheral channel 411 and fully wrap around the circumference of the housing 380 and enter the recess 414 again. After exiting the first peripheral channel 411 and entering the recess 414, the electrical wire of the antenna 400 may extend along a second path 418B (e.g., diagonally) across the recess 414 and enter the second peripheral channel 412. The antenna 400 may extend through the second peripheral channel 412 and wrap (e.g., partially or fully wrap) around the housing 380 and terminate in the second periphery channel 412. The electrical wire of the antenna 400 may be held in the first and second peripheral channels 411, 412 and the intermediate channel 415 by tabs 419.

When the wireless communication circuit 399 drives the antenna 400 with a signal, the antenna 400 may emit electromagnetic waves (e.g., radio-frequency signals). As previously mentioned, the antenna 400 may be wrapped around the motor drive unit 390 underneath of the bearing assembly 320 (e.g., which is made from a non-conductive material, such as plastic) and adjacent to the gap 328 between the roller tube 311 and the mounting bracket 330. When the antenna 400 is emitting electromagnetic waves, the electromagnetic waves may be coupled to the roller tube 311 (e.g., which may be made of a conductive material, such as aluminum), which may result in current flow on the surface of the roller tube 311. As a result, the roller tube 311 may re-radiate the electromagnetic waves emitted by the antenna 400.

While the antenna 400 is shown in FIGS. 4-9 being wrapped around the motor drive units 390 one or more times, the antenna 400 may be wrapped around the motor drive unit 390 in other manners and/or shapes. For example, the one or more channels in which the antenna 400 is located may be formed on the inner surface 424 of the upper portion 382A of the housing 380. In addition, the antenna 400 may be internal to the housing 380 of the motor drive unit 390 (e.g., extending through one or more tunnels in the housing 380). Alternatively, the one or more channels in which the antenna 400 is located may be formed in the bearing assembly 320 (e.g., such as the stationary bearing 322).

Figure 10:
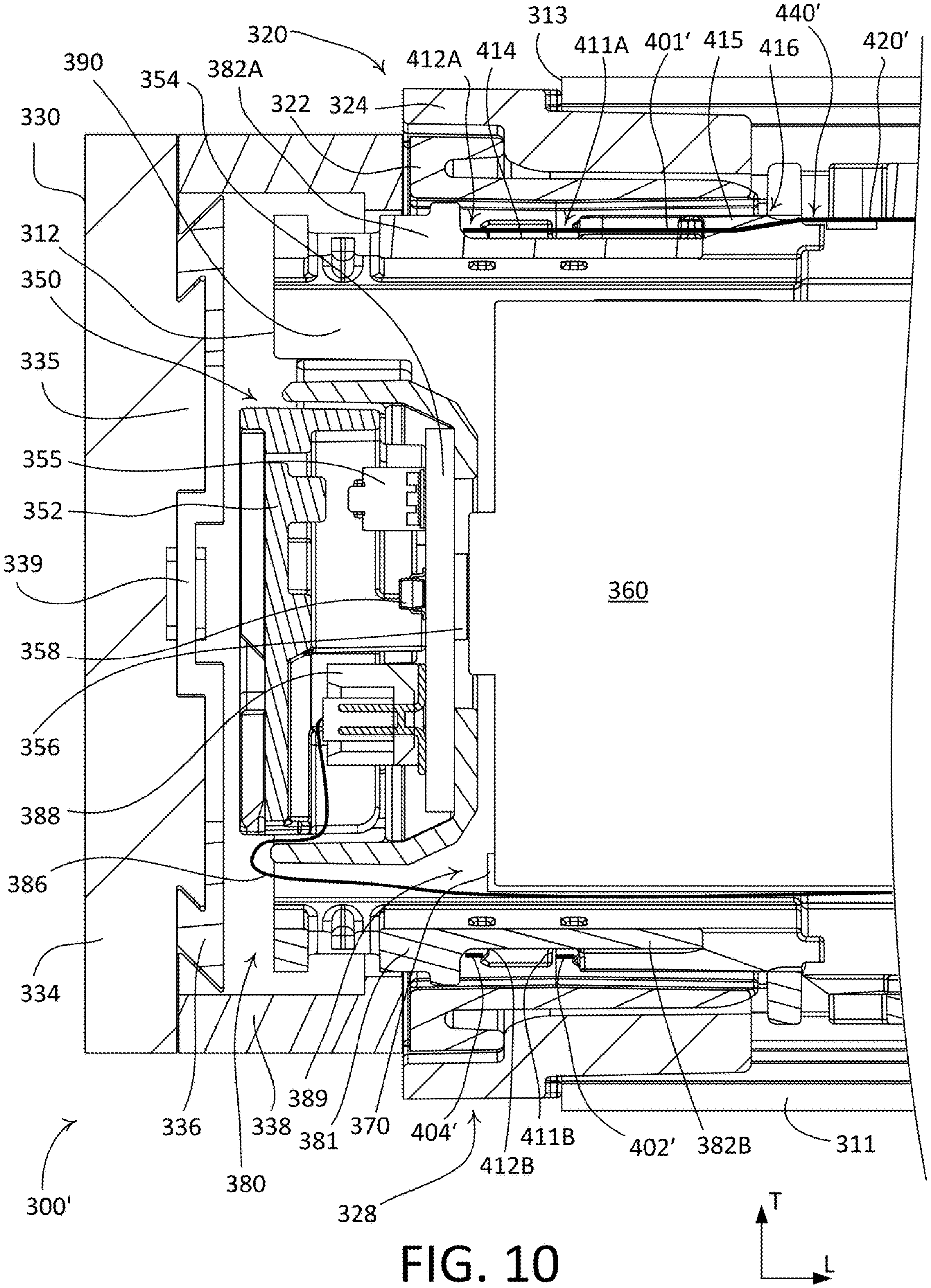
FIG. 10 is an enlarged front cross-sectional view of another example motorized window treatment.

FIG. 10 is an enlarged front cross-sectional view of another example motorized window treatment 300' (e.g., such as the motorized window treatment 100 shown in FIGS. 1 and 2, the battery-powered motorized window treatment 200 shown in FIG. 3, and/or the motorized window treatment 300 shown in FIGS. 4 and 5). The motorized window treatment 300' may include the window treatment assembly 310 having the roller tube 311 and the motor drive unit 390. The motor drive unit 390 may be powered by the one or more batteries 360. Although not shown in FIG. 10, the window treatment assembly 310 may also comprise a flexible material windingly attached to the roller tube 311 (e.g., such as the flexible material 120, 220) and an idler (e.g., such as the idler of the motorized window treatments 100, 200). The motorized window treatment 300' may also comprise one or more mounting brackets for mounting the motorized window treatment 300 to a structure, such as the first mounting bracket 330 (e.g., the first mounting bracket 130A, 230A) for supporting the motor drive unit 390 and the second mounting bracket (e.g., the second mounting bracket 130B, 230B) for supporting the idler.

Figure 11:
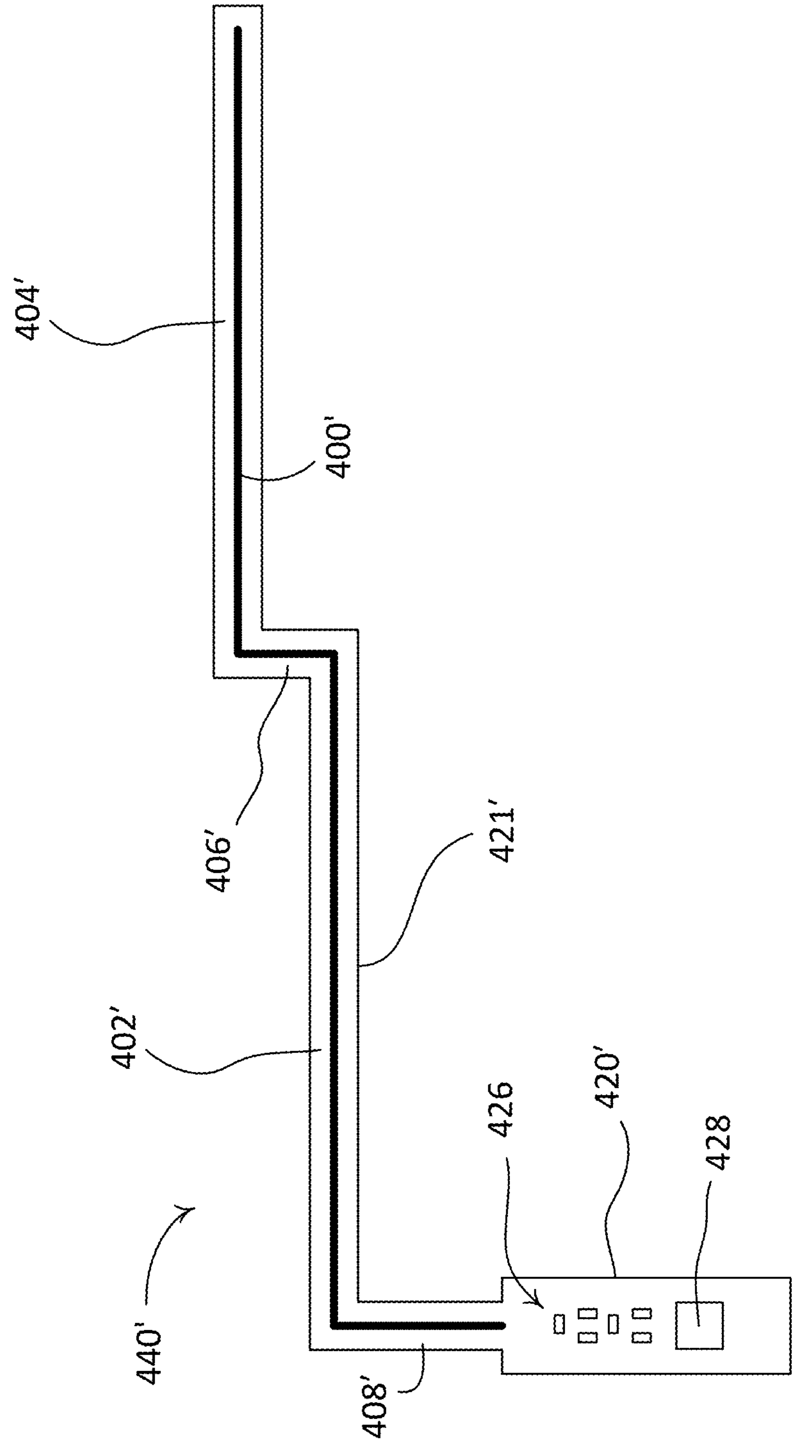
FIG. 11 is a top view of an example flexible printed circuit board having an example antenna.

FIG. 11 is a top view of a flexible printed circuit board 440' of the motor drive unit 390 of the motorized window treatment 300' (e.g., shown in an unwound state). The motor drive unit 390 may comprise an antenna 400' that may be formed on the flexible printed circuit board 440'. For example, the flexible printed circuit board 440' may replace both the coupling printed circuit board 420 and the electrical wire of the antenna 400 (e.g., of the motorized window treatment 300 shown in FIGS. 4 and 5). The flexible printed circuit board 440' may comprise an antenna portion 421' (e.g., an elongated portion) and a coupling portion 420'. The antenna 400' may comprise an electrical trace (e.g., an electrical conductor) that extends through the antenna portion 421' of the flexible printed circuit board 440' and may operate as the antenna to radiate the RF signals. The antenna 400' (e.g., the antenna portion 421' of the flexible printed circuit board 440') may be located in one or more channels, such as first and second peripheral (e.g., circumferential) channels 411, 412, in the housing 380 of the motor drive unit 390. The first peripheral channel 411 may comprise a first portion 411A formed in an outer surface 410A of the upper portion 382A of the housing 380 and a second portion 411B formed in an outer surface 410B of the lower portion 382B of the housing 380. The second peripheral channel 412 may comprise a first portion 412A formed in the outer surface 410A of the upper portion 382A of the housing 380 and a second portion 412B formed in the outer surface 410B of the lower portion 382B of the housing 380. The first and second peripheral channels 411, 412 may extend around the circumference of the housing 380 of the motor drive unit 390, such that the antenna 400' (e.g., the antenna portion 421' of the flexible printed circuit board 440') may be wrapped around the motor drive unit 390.

As shown in FIG. 11, the antenna portion 421' of the flexible printed circuit board 440' may extend from the coupling portion 420'. The antenna portion 421' of the flexible printed circuit board 440' may define first and second portion 402', 404' that are configured to be wound about the housing 380 of the motorized window treatment 300'. The antenna portion 421' of the flexible printed circuit board 440' may define a third portion 406' that connects the first and second portions 402', 404'. The third portion 406' may be substantially perpendicular to the first and second portions 402', 404', for example, such that the first and second portions 402', 404' are spaced apart (e.g., by a distance in the longitudinal direction L defined by a length of the third portion 406') when the antenna 400' is wound about the housing 380 of the motorized window treatment 300'. For example, the third portion 406' may extend through the recess 414 between the first and second peripheral channels 411, 412 when the antenna 400' is wound about the housing 380 of the motorized window treatment 300'.

The matching network circuit 426 may be mounted to the coupling portion 420' of the flexible printed circuit board 420'. For example, the coupling portion 420' of the flexible printed circuit board 440' may be located in the recess 422 in the inner surface 424 of the upper portion 382A of the housing 380. The antenna portion 421' of the flexible printed circuit board 440' may also define an intermediate portion 408' that connects the first portion 402' of the antenna portion 421' to the coupling portion 420'. For example, the intermediate portion 408' may extend through the intermediate channel 415 between the recess 422 and the first peripheral channel 411 when the antenna 400' is wound about the housing 380 of the motorized window treatment 300'. The antenna portion 421' may extend from the matching network circuit 426 on the coupling portion 420' of the flexible printed circuit board 440' in the recess 422 through the opening 415, the intermediate channel 415, and the first and second peripheral channels 411, 412. Since the flexible printed circuit board 420' is flexible, the antenna portion 421' may be configured to wrap around the housing 380 as the antenna portion 421' extends through the first and second peripheral channels 411. When the antenna portion 421' is wrapped around (e.g., wound about) the housing 380, the third portion 406' and the intermediate portion 408' may extend in the longitudinal direction L. The matching network circuit 426 may be electrically coupled to the motor drive printed circuit board 392 via the coaxial cable 430 that may be connected to the coaxial connector 428 and may extend through the coaxial cable channel 432. The antenna 400' may be electrically coupled to the wireless communication circuit 399 on the motor drive printed circuit board 392 via the matching network circuit 426 on the coupling portion 420' of the flexible printed circuit board 440', such that the electrical trace on the antenna portion 421' of the flexible printed circuit board 440' may radiate the RF signals.

As shown in FIG. 10, the antenna 400' (e.g., the antenna portion 421' of the flexible printed circuit board 440') may be wrapped around the housing 380 of the motor drive unit 390 adjacent to the end 313 of the roller tube 311. For example, the antenna 400' may be wrapped around the housing 380 of the motor drive unit 390 below the bearing assembly 320, e.g., such that the antenna 400' is located within an area that surrounds the circumference of the motor drive unit and falls within an area defined by the bearing assembly 320. The antenna 400' may be wrapped around the motor drive unit 390 adjacent to the gap 328 between the roller tube 311 and the mounting bracket 330 (e.g., lie at least partially within the area defined by the gap). For example, the antenna 400' may be aligned with the gap 328. The antenna 400' may transmit and/or receive RF signals through the gap 328. In addition, when the antenna 400' is emitting electromagnetic waves, the electromagnetic waves may be coupled to the roller tube 311 (e.g., capacitively coupled to the roller tube), which may result in current flow (e.g., standing waves) on the surface of the roller tube 311 (e.g., since the roller tube 311 is made from a conductive material). As a result, the roller tube 311 may re-radiate the electromagnetic waves emitted by the antenna 400', which may increase the amount of RF signals transmitted and/or received by the antenna 400'.

A distance (e.g., in the longitudinal direction L) between windings of the antenna 400' may be configured to prevent the antenna 400' from coupling to itself. For example, the first portion 402' of the antenna 400' may be spaced apart by the distance from the second portion 404' of the antenna 400', when the antenna 400' (e.g., the electrical trace of the antenna portion 421' of the flexible printed circuit board 440') is received within the first and second peripheral channels 411, 412. For example, the distance between adjacent windings of the antenna 400' in the first peripheral channel 411 and the second peripheral channel 412 may be approximately 0.1 to 0.4 inches (e.g., such as 0.2 inches). The first peripheral channel 411 may be located closer to the roller tube 311 than the second peripheral channel 412. For example, the first peripheral channel 411 may be close to an outer edge of the roller tube 311 and partially underneath of the roller tube 311 (e.g., but not fully underneath of the roller tube 311) as shown in FIG. 10. For example, the second peripheral channel 412 may be located as far away from the first peripheral channel 411 as possible, but not underneath or within the attachment portion 338 of the mounting bracket 330. A center of the first peripheral channel 411 may be, for example, approximately 0.20 inches away from a center of the second peripheral channel 412.

Figure 12:
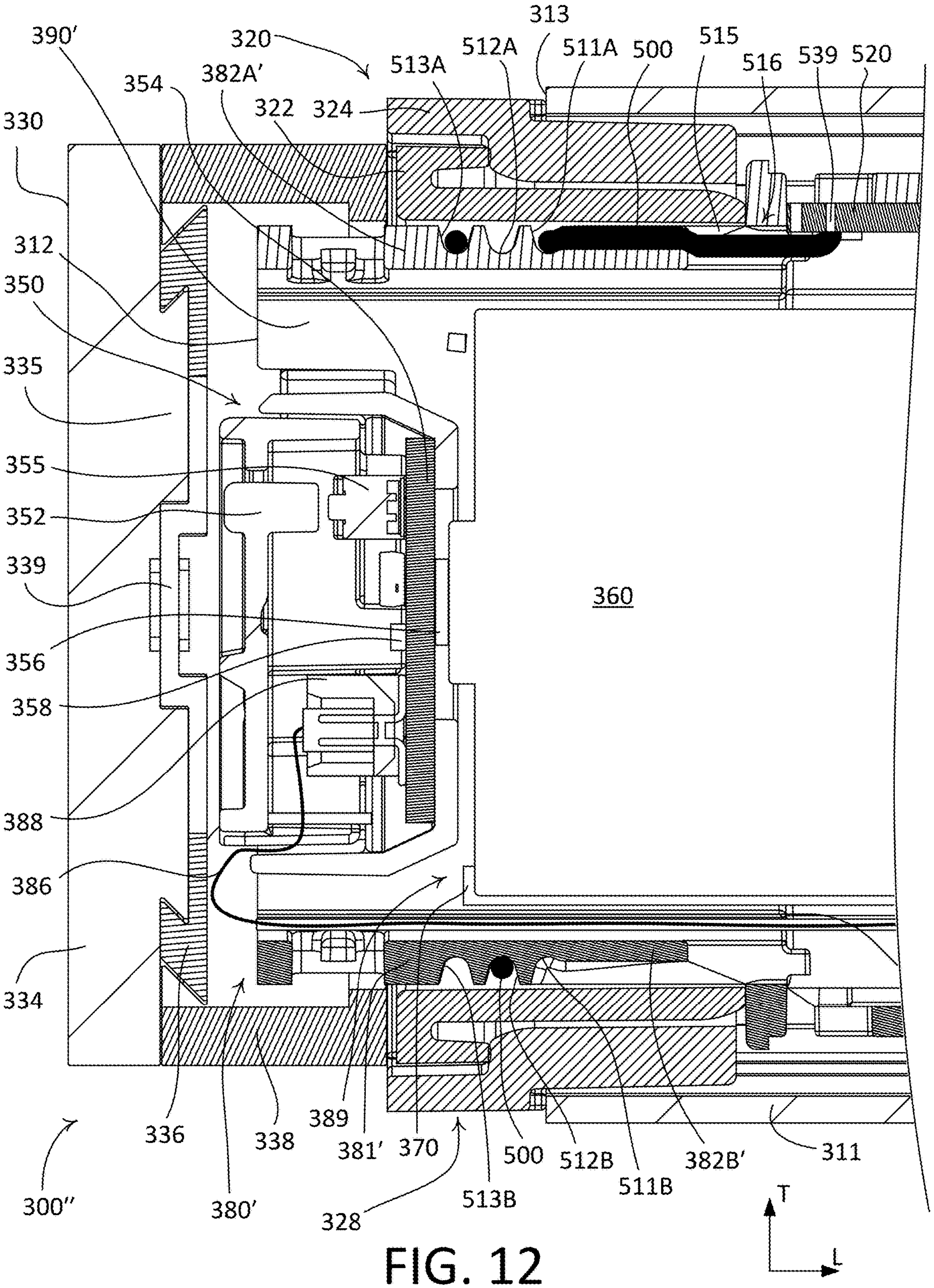
FIG. 12 is an enlarged front cross-sectional view of another example motorized window treatment.
Figure 13:
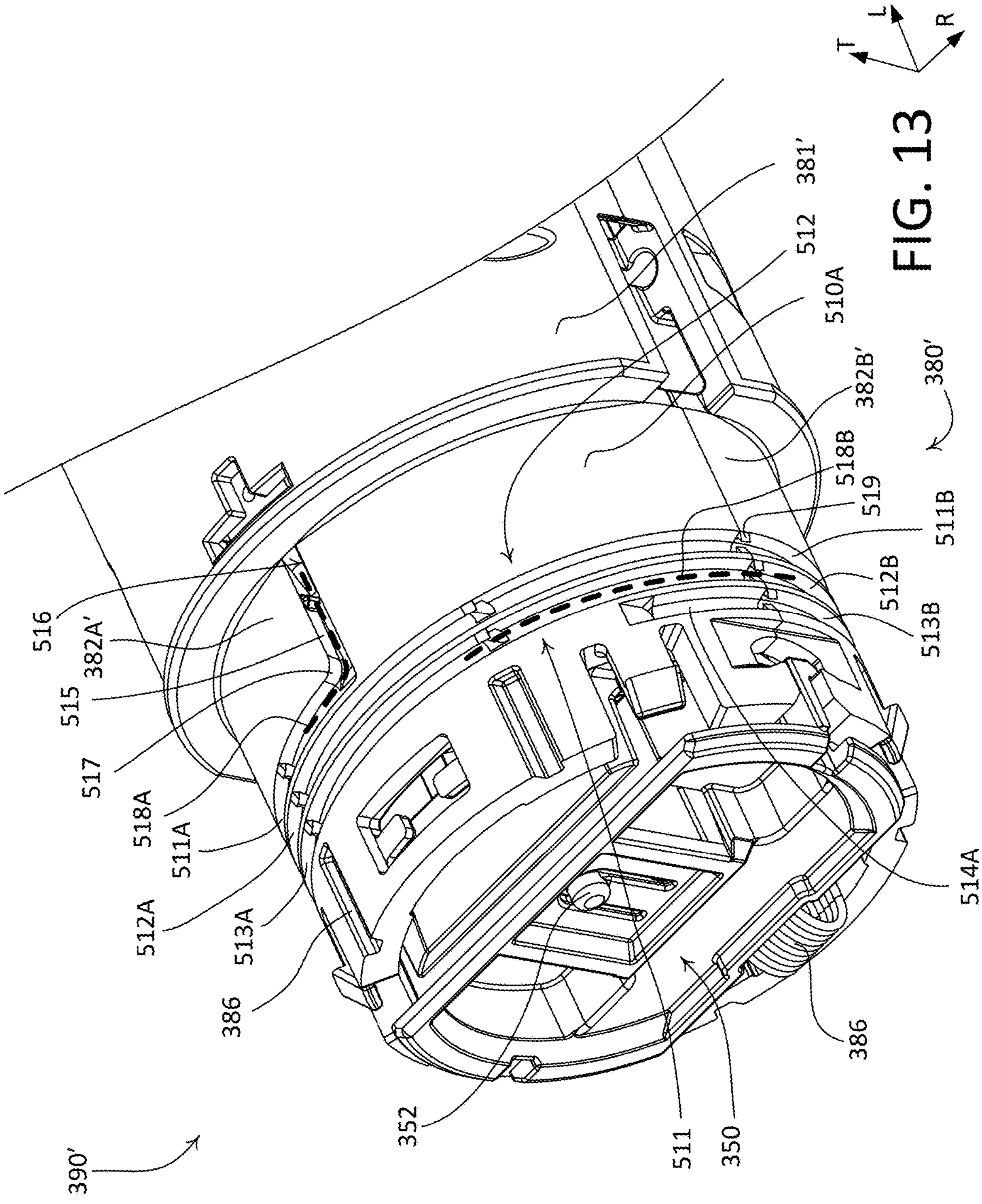
FIG. 13 is an enlarged perspective view of an end portion of a motor drive unit of the example motorized window treatment of FIG. 12 with a bearing assembly removed.

FIG. 12 is an enlarged front cross-sectional view of another example motorized window treatment 300". The motorized window treatment 300" may comprise a motor drive unit 390' having an antenna 500. The motorized window treatment 300" and the motor drive unit 390' may have many similar components as the motorized window treatment 300 and the motor drive unit 390 shown in FIGS. 2-9, respectively. The motor drive unit 390' may comprise a housing 380'. The housing 380' may comprise a body 381' and a cap 350 (e.g., the cap 250). The body 381' may be cylindrical. The cap 350 may be configured to attach to the body 381. The body 381' may comprise an upper portion 382A' and a lower portion 382B'. FIG. 13 is an enlarged perspective view of an end portion of the motor drive unit 390' with a bearing assembly (e.g., the bearing assembly 320) removed. Rather than comprising the first and second peripheral channels 411, 412 that are parallel to each other and extend around the circumference of the motor drive unit 390, the motor drive unit 390' may comprise a spiral-shaped channel 511 that extends around the housing 380' (e.g., the body 381') of the motor drive unit 390' (e.g., about the periphery of the housing 380'). The spiral-shaped channel 511 may be a continuous spiral that moves farther and farther away, in the longitudinal direction L, from the roller tube 311. The antenna 500 may be located within the spiral-shaped channel 511, such that the antenna 500 may be wrapped around the motor drive unit 390'. For example, the antenna 500 may be received within the spiral-shaped channel 511. A distance (e.g., in the longitudinal direction L) between windings of the antenna 500 may be configured to prevent the antenna 500 from coupling to itself. For example, the distance between adjacent windings (e.g., wound portions) of the antenna 500 in the spiral-shaped channel 511 may be approximately 0.1 to 0.4 inches (e.g., such as 0.2 inches). The antenna 500 may comprise an insulated electrical conductor, for example, such as a 22-gauge stranded electrical wire with a polyvinyl chloride (PVC) coating.

The upper portion 382A' of the housing 382' may comprise a first channel portion 511A, a second channel portion 512A, a third channel portion 513A, and a fourth channel portion 514A formed in an outer surface 510A of the upper portion 382A'. The lower portion 382B' of the housing 382' may be identical to the upper portion 382A' and may comprise a first channel portion 511B, a second channel portion 512B, a third channel portion 513B, and a fourth channel portion (not shown) formed in an outer surface 510B of the lower portion 382B'. The fourth channel portion of the lower portion 382B' of the housing 382' may be similar (e.g., identical) to the fourth channel portion 514A of the upper portion 382A' and may be aligned with the third channel portion 513A of the upper portion 382A'. The spiral-shaped channel 511 in which the antenna 500 resides may include the first channel portion 511A of the upper portion 382A', the second channel portion 512B of the lower portion 382B', the third channel portion 513A of the upper portion 382A', and the fourth channel portion of the lower portion 382B'.

The upper portion 382A' of the housing 382' may comprise a second spiral-shaped channel 512 which remains vacant when the antenna 500 is spirally wound about the motor drive unit 390' may include the second channel portion 512A of the upper portion 382A', the first channel portion 511B of the lower portion 382B', and the third channel portion 513B of the lower portion 382B', and the fourth channel portion 514A of the upper portion 382A'. The first and second portions 382A', 382B' of the housing 380' may be identical, such that two separate types of unique housing parts are not required to form the housing 380' of the motor drive unit 390'. Since only one type of housing portion is required to form the housing 380', a manufacturer of the motor drive unit 390' is able to stock less parts in inventory. Because the upper portion 382A' and the lower portion 382B' are identical, the housing 380' may comprise a second spiral-shaped channel formed by the first channel portion 511B of the lower portion 382B', the second channel portion 512A of the upper portion 382A', the third channel portion 513B of the lower portion 382B', and the fourth channel portion 514A of the upper portion 382A'.

Although the body 380' of the housing 380' of the motor drive unit 390' is shown in the figures as having an upper portion 382A' and a lower portion 382B' that are identical, it should be appreciated that the body 381' could alternatively be a single piece, two non-identical pieces, or more than two pieces. While the antenna 500 is shown in FIGS. 12 and 13 being wrapped around the housing 380' (e.g., the body 380') of the motor drive unit 390' one or more times, the antenna 500 may be wrapped around the motor drive unit 390' in other manners and/or shapes. For example, the spiral-shaped channel 511 in which the antenna 500 is located may be formed on the inner surface 424 of the upper portion 382A' of the body 380". In addition, the antenna 500 may be internal to the housing 380' (e.g., the body 380') of the motor drive unit 390' (e.g., extending through one or more tunnels in the housing 380'). Although the spiral-shaped channel 511 is shown on the outer surfaces 510A, 510B of the housing 380', it should be appreciated that the spiral-shaped channel 511 could instead be located on the bearing assembly 320 (e.g., such as the stationary bearing 322).

As shown in FIG. 12, the antenna 500 may be wrapped around the motor drive unit 390' below the bearing assembly 320, e.g., such that the antenna 400 is located within an area that surrounds the circumference of the motor drive unit 390' and falls within an area defined by the bearing assembly 320. The antenna 500 may be wrapped around (e.g., spirally wound about) the motor drive unit 390' adjacent to the gap 328 between the roller tube 311 and the mounting bracket 330 (e.g., located at least partially within the area defined by the gap 328). For example, the antenna 500 may be aligned with the gap 328. The antenna 500 may transmit and/or receive RF signals through the gap 328. Because the components (e.g., all of the components) of the motorized window treatment 300 in and/or adjacent to the gap 328 are non-conductive, interference with and/or disruption of the RF signals being transmitted and/or received by the antenna 500 may be minimized (e.g., prevented). The spiral-shaped channel 511 may continuously move the antenna 500 away from the roller tube 311 in the longitudinal direction L as the antenna 500 follows the spiral-shaped channel 511.

Figure 14:
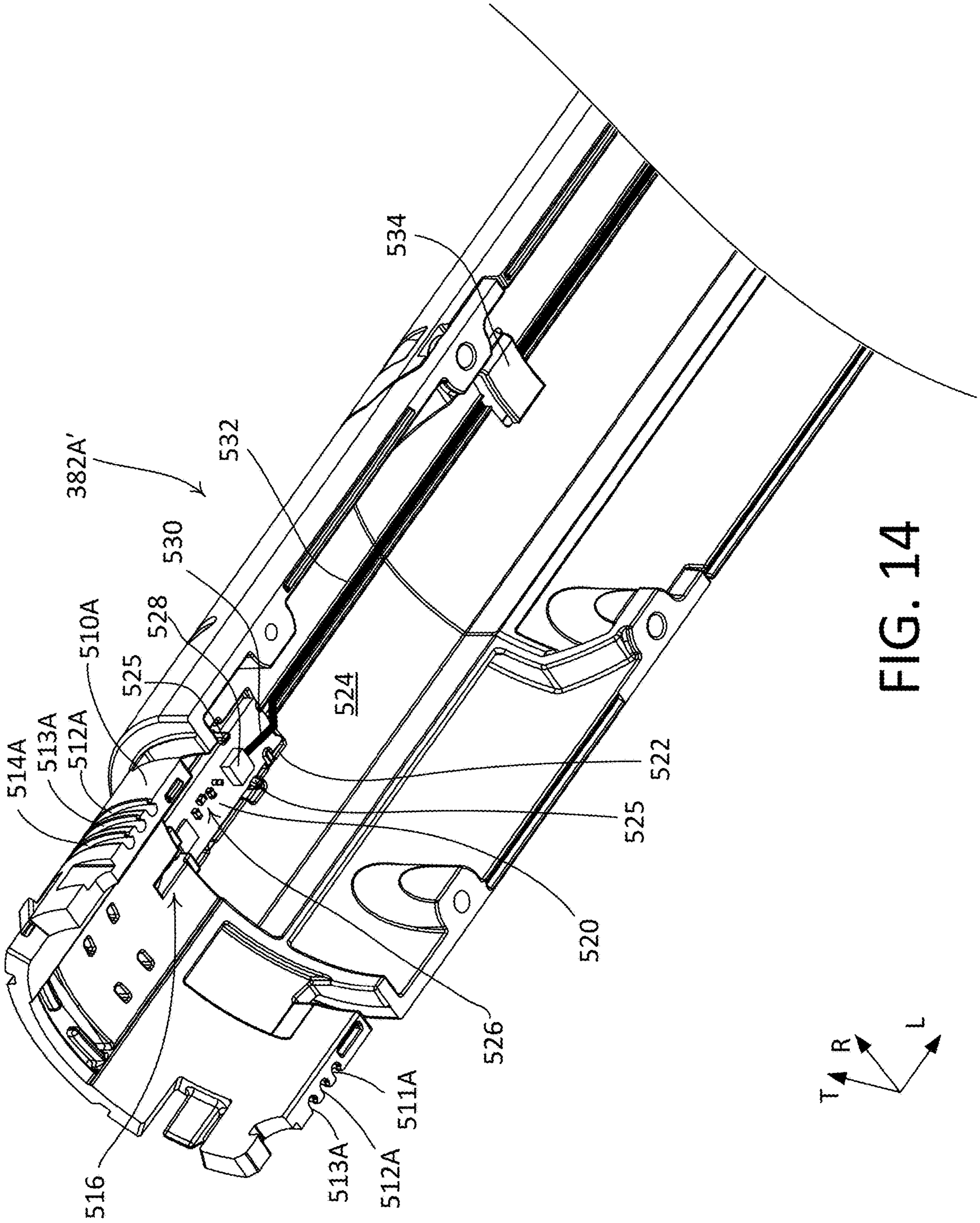
FIG. 14 is a partial exploded view of the motor drive unit of FIG. 13 looking up into the inside of an upper portion of a housing of the motor drive unit.

FIG. 14 is a partially exploded view of the motor drive unit 390' looking up into the inside of the upper portion 382A' of the housing 380'. The motor drive unit 390' may comprise a coupling printed circuit board 520 for coupling the antenna 500 to the wireless communication circuit 399 mounted to the motor drive printed circuit board 392. The coupling printed circuit board 520 may be received in a recess 522 in an inner surface 524 of the upper portion 382A' of the housing 380'. For example, the coupling printed circuit board 520 may be held in the recess 522 by one or more snaps 525. The coupling printing circuit board 520 may have a matching network circuit 526 mounted thereto. The matching network circuit 526 may be electrically coupled between the antenna 500 and the wireless communication circuit 399 mounted to the motor drive printed circuit board 392. The matching network circuit 526 may be electrically coupled to the wireless communication circuit 399 on the motor drive printed circuit board 392 via a coaxial cable 530, which may be electrically coupled to the coupling printed circuit board 520 via a coaxial connector 528. The matching network circuit 526 may be configured to optimize the performance of the antenna 500. For example, the matching network circuit 526 may be configured to match an impedance of the antenna 500 to an impedance of the wireless communication circuit 399 to obtain a maximum transfer of power between the antenna 500 and the wireless communication circuit 399. The matching network circuit 526 may include, for example, an inductor-capacitor (LC) filter. The coaxial cable 530 may extend through a coaxial cable channel 532 formed in the inner surface 524 of the upper portion 382A' of the housing 380'. The coaxial cable 530 may be held in place within the coaxial cable channel 532 by one or more tabs 534. The coaxial cable channel 532 may extend in the longitudinal direction L of the motorized window treatment 300'. In addition, the wireless communication circuit 399 may be mounted to the coupling printed circuit board 520 and the wireless communication circuit 399 may be coupled to the circuitry on the motor drive printed circuit board 392 via a cable, such as a ribbon cable (e.g., like the ribbon cable 386).

As shown in FIG. 12, the antenna 500 may terminate at the coupling printed circuit board 530. For example, the antenna 500 may be received through a through-hole 539 in the coupling printed circuit board 530. The antenna may be soldered to an electrical pad surrounding the through-hole 539, for example, to electrically couple the antenna 500 to the matching network circuit 536. The antenna 500 may extend from the spiral-shaped channel 511 (e.g., the first portion 511A in the upper portion 382A' of the housing 380') through an intermediate channel 515 and an opening 516 to the coupling printed circuit board 530. The intermediate channel 515 may also be formed in the outer surface 510A of the upper portion 382A' of the housing 380 and may extend in the longitudinal direction L of the motorized window treatment 300'.

As the antenna 500 exits the intermediate channel 515 from coupling printed circuit board 530 and enters the spiral-shaped channel 511, the electrical wire of the antenna 500 may follow a first path 518A to extend along the first channel portion 511A in the upper portion 382A'. A corner 517 adjacent to the antenna 500 in the first channel portion 511A of the upper portion 382A' may be rounded to facilitate bending of the electrical wire of the antenna 500. The antenna 500 may extend through the spiral-shaped channel 511 and fully wrap around the circumference of the housing 380' one or more times. The antenna 500 may extend through the first channel portion 511A of the upper portion 382A', the second channel portion 512B of the lower portion 382B', the third channel portion 513A of the upper portion 382A', and the fourth channel portion of the lower portion 382B'. For example, the antenna 500 may extend along a second path 518B from the second channel portion 512B of the lower portion 382B' to the third channel portion 513A of the upper portion 382A'. Stated differently, the second path 518B of the antenna 500 may extend from the second channel portion 512B of the lower portion 382B' to the third channel portion 513A of the upper portion 382A'. The antenna 500 may or may not extend for the full length of the spiral-shaped channel 511. For example, the antenna 500 may not extend into the fourth channel portion of the lower portion 382B'. The electrical wire of the antenna 500 may be held in the spiral-shaped channel 511 and the intermediate channel 515 by tabs 519. For example, the tabs 519 may be configured to retain the antenna 500 within the spiral-shaped channel 511.

When the wireless communication circuit 399 drives the antenna 500 with a signal, the antenna 500 may emit electromagnetic waves (e.g., radio-frequency signals). As previously mentioned, the antenna 500 may be wrapped around the motor drive unit 390' underneath of the bearing assembly 320 (e.g., which is made from a non-conductive material, such as plastic) and adjacent to the gap 328 between the roller tube 311 and the mounting bracket 330.

When the antenna 500 is emitting electromagnetic waves, the electromagnetic waves may be coupled to the roller tube 311 (e.g., which may be made of a conductive material, such as aluminum), which may result in current flow on the surface of the roller tube 311. As a result, the roller tube 311 may re-radiate the electromagnetic waves emitted by the antenna 500. Because the antenna 500 extends through the spiral-shaped channel 511, the antenna 500 may more quickly move in distance away from the roller tube, which may allow more electromagnetic waves to couple to the roller tube 311 (e.g., as compared to extending through the first and second peripheral channels 411, 412).

In some examples, the antenna 500 may be formed on a flexible printed circuit board (not shown). The flexible printed circuit board may replace both the coupling printed circuit board 520 and the electrical wire of the antenna. The matching network circuit 526 may be mounted to the flexible printed circuit board, for example, to a coupling portion of the flexible printed circuit board that is located in the recess 522 in the inner surface 524 of the upper portion 382A' of the housing 380'. The flexible printed circuit board may comprise an antenna portion (e.g., an elongated portion) having an electrical trace (e.g., an electrical conductor) that may operate as the antenna to radiate the RF signals. The antenna portion may extend from the matching network circuit 526 on the portion of the flexible printed circuit board in the recess 522 through the opening 515, the intermediate channel 515, and the spiral-shaped channel 511. Since the flexible printed circuit board is flexible, the antenna portion may be configured to wrap around the housing 380' as the antenna portion extends through the first and second peripheral channels 511. The matching network circuit 526 may be electrically coupled to the motor drive printed circuit board 392 via the coaxial cable 530 that extends through the coaxial cable channel 532.

Figure 15:
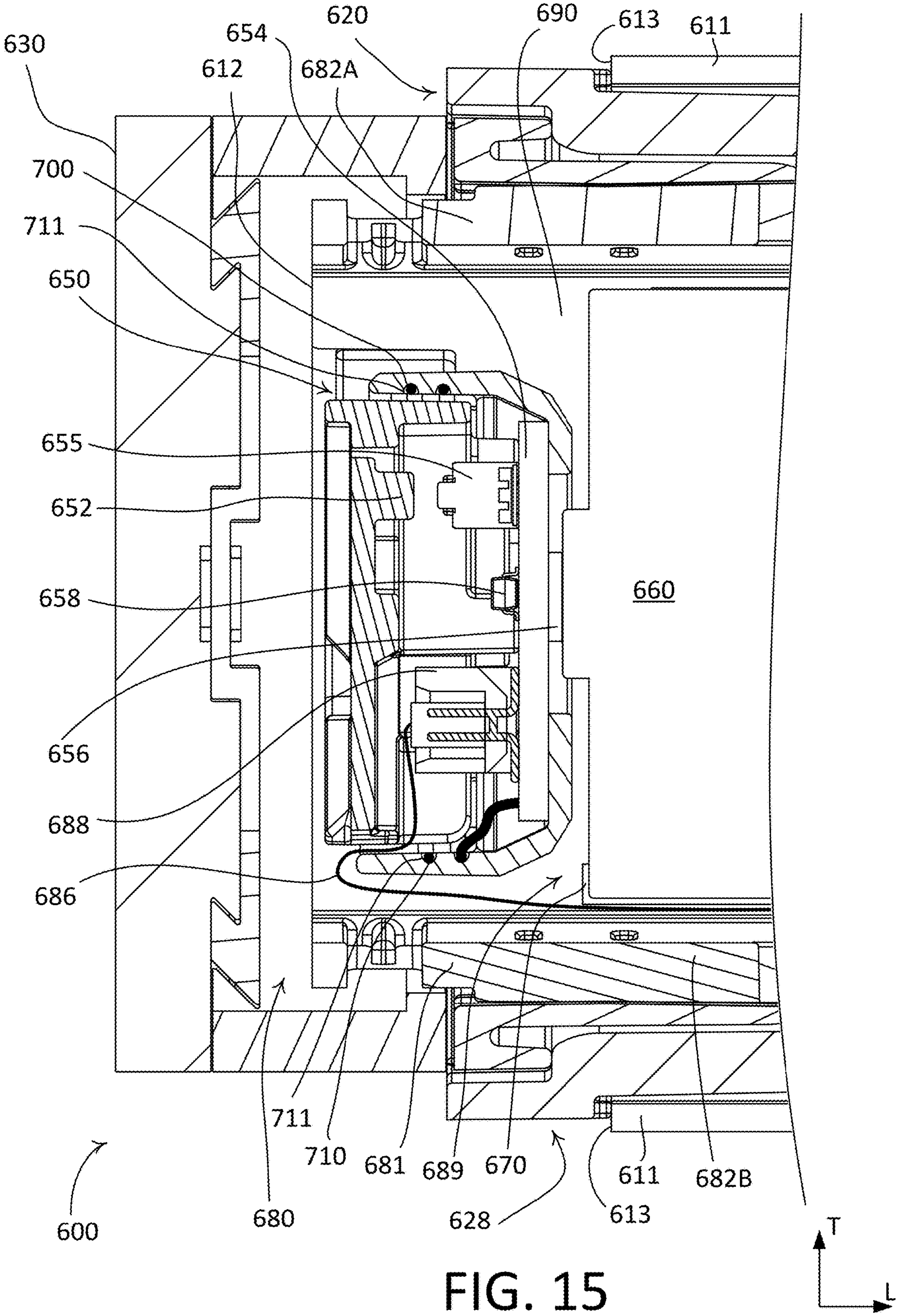
FIG. 15 is an enlarged front cross-sectional view of another example motorized window treatment.

FIG. 15 is an enlarged front cross-sectional view of another example motorized window treatment 600. The motorized window treatment 600 may include a window treatment assembly (e.g., the window treatment assembly 310) having a roller tube 611 (e.g., the roller tube 311) and a motor drive unit 690. The roller tube 611 may be made from a conductive material, such as aluminum or other suitable metal. The motor drive unit 690 may be powered by one or more batteries 660 (e.g., the batteries 360). Although not shown in FIGS. 4-5, the window treatment assembly may also comprise a flexible material windingly attached to the roller tube 611 (e.g., such as the flexible material 120, 220) and an idler (e.g., such as the idler of the motorized window treatments 100, 200). The motorized window treatment 600 may also comprise one or more mounting brackets for mounting the motorized window treatment 600 to a structure, such as a first mounting bracket 630 (e.g., the first mounting bracket 130A, 230A, 330) for supporting the motor drive unit 690 and a second mounting bracket (e.g., the second mounting bracket 130B, 230B) for supporting the idler. The first mounting bracket 630 and the second mounting bracket may be made from a conductive material, such as aluminum or other suitable metal. In addition, the first mounting bracket 630 and the second mounting bracket may be made from a non-conductive material, such as plastic. For example, the first mounting bracket 630 may be identical to the first mounting bracket 330 shown in FIGS. 4-9. The motorized window treatment 600 may be adjusted between an operating position (e.g., as shown in FIGS. 1, 4, and 5) to an extended position (e.g., as shown in FIGS. 2 and 3) while secured to the first mounting bracket 630 and the second mounting bracket.

The motor drive unit 690 may comprise a housing 680. The housing 680 may comprise a body 681 and a cap 650 (e.g., the cap 250 and/or the cap 350). The body 681 may be cylindrical. The cap 650 may be configured to attach to the body 681. The body 681 may comprise an upper portion 682A and a lower portion 682B. The motor drive unit 690 may be operatively coupled to the roller tube 611, for example, via a coupler (e.g., the coupler 395). The coupler may be an output gear that transfers rotation of a motor (e.g., the motor 396) to the roller tube 611. The motorized window treatment 600 (e.g., the motor drive unit 390) may include a bearing assembly 620, that may be captured between the roller tube 611 and the mounting bracket 630. For example, the bearing assembly 620 may be identical to the bearing assembly 320. The bearing assembly 620 may be made of non-metallic (e.g., plastic) sleeve bearings. The bearing assembly 620 may be captured between the roller tube 611 and the mounting bracket 630, such that the bearing assembly 620 may be located in a gap 628 (e.g., a longitudinal gap) between the roller tube 611 and the mounting bracket 630. The components of the motorized window treatment 600 in and/or adjacent to the gap 628 may be non-conductive such that radio-frequency field disruption and/or shielding is minimized. For example, the motorized window treatment 600 may not include conductive (e.g., metal) components in an area radially surrounding the gap 628.

The motor drive unit 690 may include a battery holder 670 (e.g., the battery holder 270, 370). The battery holder 670 and the cap 650 may keep the batteries 660 fixed in place securely while the batteries 660 are providing power to the motor drive unit 690 and/or the cap 650. The battery holder 670 may be configured to clamp the batteries 660 together such that the batteries 660 can be removed from the motorized window treatment 600 at the same time (e.g., together). The battery holder 670 may be received in a motor drive unit cavity 689 of the motor drive unit 690. The batteries 660 may be configured to be removed from the motor drive unit 690, for example, while the housing 680 of the motor drive unit 690 remains engaged with the first mounting bracket 630 and the second mounting bracket. That is, the batteries 660 may be configured to be removed from the motor drive unit 690 when the motorized window treatment 300 is in the pivoted position.

The cap 650 may be configured to cover an end of the motor drive unit cavity 689. For example, the cap 650 may be received (e.g., at least partially) within the motor drive unit cavity 689. The cap 650 may comprise a first portion 651 and a second portion 653. The cap 650 may include a button 652 (e.g., formed as part of the first portion 651 of the cap 650), a control interface printed circuit board 654 (e.g., that is housed between the first portion 651 and the second portion 653), and an electrical contact 656 (e.g., a conductive pad) electrically coupled to the control interface printed circuit board 654. For example, the electrical contact 656 may be a positive electrical contact. Alternatively, the electrical contact 656 may be a negative electrical contact. The cap 650 may include a switch 655 (e.g., a mechanical tactile switch) mounted to the control interface printed circuit board 654 and configured to be actuated in response to actuations of the button 652. The button 652 may be illuminated by a light-emitting diode (LED) 658 mounted to the control interface printed circuit board 654. The motor drive unit 690 may also comprise a wireless communication circuit (e.g., the wireless communication circuit 399) mounted to the interface printed circuit board 654.

As with the motor drive unit 390 shown in FIG. 4, the motor drive unit 690 may include a motor drive printed circuit board (e.g., the motor drive printed circuit board 392), an intermediate storage device (e.g., the intermediate storage device 394), and a gear assembly (e.g., the gear assembly 398). The batteries 660 may be located between the cap 650 and the motor drive printed circuit board of the motor drive unit 690. The motor drive printed circuit board may have mounted thereto a motor drive circuit for driving the motor and a control circuit for controlling the motor drive circuit mounted to the motor drive printed circuit board. The motor drive unit 690 may include a spring (e.g., the spring 384) configured to abut and apply a force to one of the batteries 660, for example, such that the batteries 660 remain in contact with one another while installed within the motor drive unit cavity 689 (e.g., to maintain electrical connection of the batteries 660 with the spring and the electrical contact 656 of the cap 650). The spring may be electrically coupled to the motor drive printed circuit board and may be a negative electrical contact. Alternatively, the spring may be a positive electrical contact.

The button 652 may be configured to enable a user to change one or more settings of the motorized window treatment 600. For example, the button 652 may be configured to change one or more settings of the control interface printed circuit board 654 and/or the motor drive printed circuit board. The button 652 may be configured to enable a user to pair the motorized window treatment 600 with a remote control device to allow for wireless communication between the remote control device and the wireless communication circuit mounted to the interface printed circuit board 654. The button 652 may be configured to provide a status indication to a user. For example, the control button 652 may be configured to flash and/or change colors to provide the status indication to the user. The button 652 may be configured to indicate (e.g., via the status indication) whether the motor drive unit 690 is in a programming mode.

The control interface printed circuit board 654 and the motor drive printed circuit board may be electrically connected. For example, the motorized window treatment 600 may include a ribbon cable 686. The ribbon cable 686 may be attached to a connector 688 mounted to the control interface printed circuit board 654 and a similar connector mounted to the motor drive printed circuit board. The ribbon cable 686 may be configured to electrically connect the control interface printed circuit board 654 and the motor drive printed circuit board. The ribbon cable 686 may terminate at the control interface printed circuit board 654 and the motor printed circuit board. For example, the ribbon cable 686 may extend within the motor drive unit cavity 689. The ribbon cable 686 may include electrical conductors for providing power from the batteries 660 to the control interface printed circuit board 654 and/or the motor drive printed circuit board. The ribbon cable 686 may include electrical conductors for conducting control signals (e.g., for transmitting one or more messages) between the control interface printed circuit board 654 and the motor drive printed circuit board. For example, the ribbon cable 686 may be configured to conduct power and/or control signals between the control interface printed circuit board 654 and the motor drive printed circuit board.

The motor drive unit 690 may further comprise an antenna 700. For example, the antenna 700 may comprise an insulated electrical conductor, such as a 22-gauge stranded electrical wire with a polyvinyl chloride (PVC) coating. The antenna 700 may be wrapped around (e.g., wound about) the housing 680. The antenna 700 may be located in a channel 711 (e.g., a spiral-shaped channel) that extends around the cap 650 of the housing 630 of the motor drive unit 690 (e.g., about the periphery of the cap 650), such that the antenna 700 may be wrapped around (e.g., wound about) the cap 650. For example, the channel 711 may be similar in shape as the spiral-shaped channel 511 that extends around the housing 380' of the motor drive unit 390' (e.g., as shown in FIG. 11). The channel 711 may be a continuous spiral that moves farther and farther away, in the longitudinal direction L, from the roller tube 611. Alternatively, the channel 711 may comprise at least two peripheral channels that extend parallel to each other around the circumference of the cap 650 (e.g., similar to the first and second peripheral channels 411, 412). The at least two peripheral channels may be joined together at a recess (e.g., similar to the recess 414) such that the electrical conductor of the antenna 700 is configured to pass from one peripheral channel 711 to another via the recess. The antenna 700 may be located within the channel 711, such that the antenna 700 may be wrapped around the cap 650. The electrical wire of the antenna 700 may be held in the channel 711 by tabs (e.g., such as the tabs 419). A distance (e.g., in the longitudinal direction L) between windings of the antenna 700 may be configured to prevent the antenna 700 from coupling to itself. The antenna 700 may comprise an insulated electrical conductor, for example, such as a 22-gauge stranded electrical wire with a polyvinyl chloride (PVC) coating.

As shown in FIG. 15, the antenna 700 may be wrapped around the cap 650 of the housing 680 of the motor drive unit 690 adjacent to an end 613 of the roller tube 611. For example, the antenna 700 may be wrapped around the cap 650 of the housing 680 adjacent to the gap 628 between the roller tube 611 and the mounting bracket 630. The antenna 700 may transmit and/or receive RF signals through the gap 628. In addition, the antenna 700 may be configured to couple (e.g., capacitively couple) to the roller tube 611 (e.g., when the roller tube 611 is made of a conductive material), such that standing waves are generated on a surface of the roller tube 611, which may increase the amount of RF signals transmitted and/or received by the antenna 700.

As shown in FIG. 15, the channel 711 may be formed in an inner surface of the second portion 653 of the cap 650. In addition, the channel 711 may be formed in an outer surface of the second portion 653 and/or an inner or outer surface of the first portion 651. Rather than the channel 711 being a single spiral-shaped channel, the cap 650 of the housing 680 may comprise one or more channels, such as parallel peripheral (e.g., circumferential) channels (e.g., as with the first and second peripheral channels 411, 412 in the housing 380 of the motor drive unit 390 as shown in FIG. 8).

The antenna 700 may be mechanically and electrically coupled to the control interface printed circuit board 654 for electrically coupling to the wireless communication circuit on the control interface printed circuit board 654. The control interface printed circuit board 654 may have a matching network circuit (e.g., similar to the matching network circuit 426) mounted thereto. The matching network circuit may be electrically coupled between the antenna 700 and the wireless communication circuit mounted to the control interface printed circuit board 654. The matching network circuit on the control interface printed circuit board 654 may be configured to optimize the performance of the antenna 700. For example, the matching network circuit may be configured to match an impedance of the antenna 700 to an impedance of the wireless communication circuit on the control interface printed circuit board 654 to obtain a maximum transfer of power between the antenna 700 and the wireless communication circuit. The matching network circuit may include, for example, an inductor-capacitor (LC) filter. The wireless communication circuit on the control interface printed circuit board 654 may be electrically coupled to a motor control circuit on the motor control printed circuit board via the ribbon cable 686. Alternatively, the wireless communication circuit may be mounted to the motor drive printed circuit board, and the matching network circuit on the control interface printed circuit board 654 may be electrically coupled to the wireless communication circuit via a coaxial cable (e.g., the coaxial cable 430). The coaxial cable may extend through a coaxial cable channel (e.g., similar to coaxial cable channel 432 formed in the inner surface 424 of the upper portion 382A of the housing 380) in the longitudinal direction L of the motorized window treatment 600.

When the wireless communication circuit on the control interface printed circuit board 654 drives the antenna 700 with a signal, the antenna 700 may emit electromagnetic waves (e.g., radio-frequency signals). As previously mentioned, the antenna 700 may be wrapped around the cap 650 of the housing 680 of the motor drive unit 690 adjacent to the gap 628 between the roller tube 611 and the mounting bracket 630. When the antenna 700 is emitting electromagnetic waves, the electromagnetic waves may be coupled to the roller tube 611 (e.g., which may be made of a conductive material, such as aluminum), which may result in current flow on the surface of the roller tube 611 (e.g., standing waves). As a result, the roller tube 311 may re-radiate the electromagnetic waves emitted by the antenna 700.

While the antenna 700 is shown in FIG. 15 being wrapped around the motor drive units 390 one or more times, the antenna 700 may be wrapped around the motor drive unit 390 in other manners and/or shapes. For example, the one or more channels in which the antenna 700 is located may be formed on the inner surface 424 of the upper portion 382A of the housing 380. In addition, the antenna 700 may be internal to the housing 380 of the motor drive unit 390 (e.g., extending through one or more tunnels in the housing 380). Alternatively, the one or more channels in which the antenna 700 is located may be formed in the bearing assembly 320 (e.g., such as the stationary bearing 322).

Figure 16:
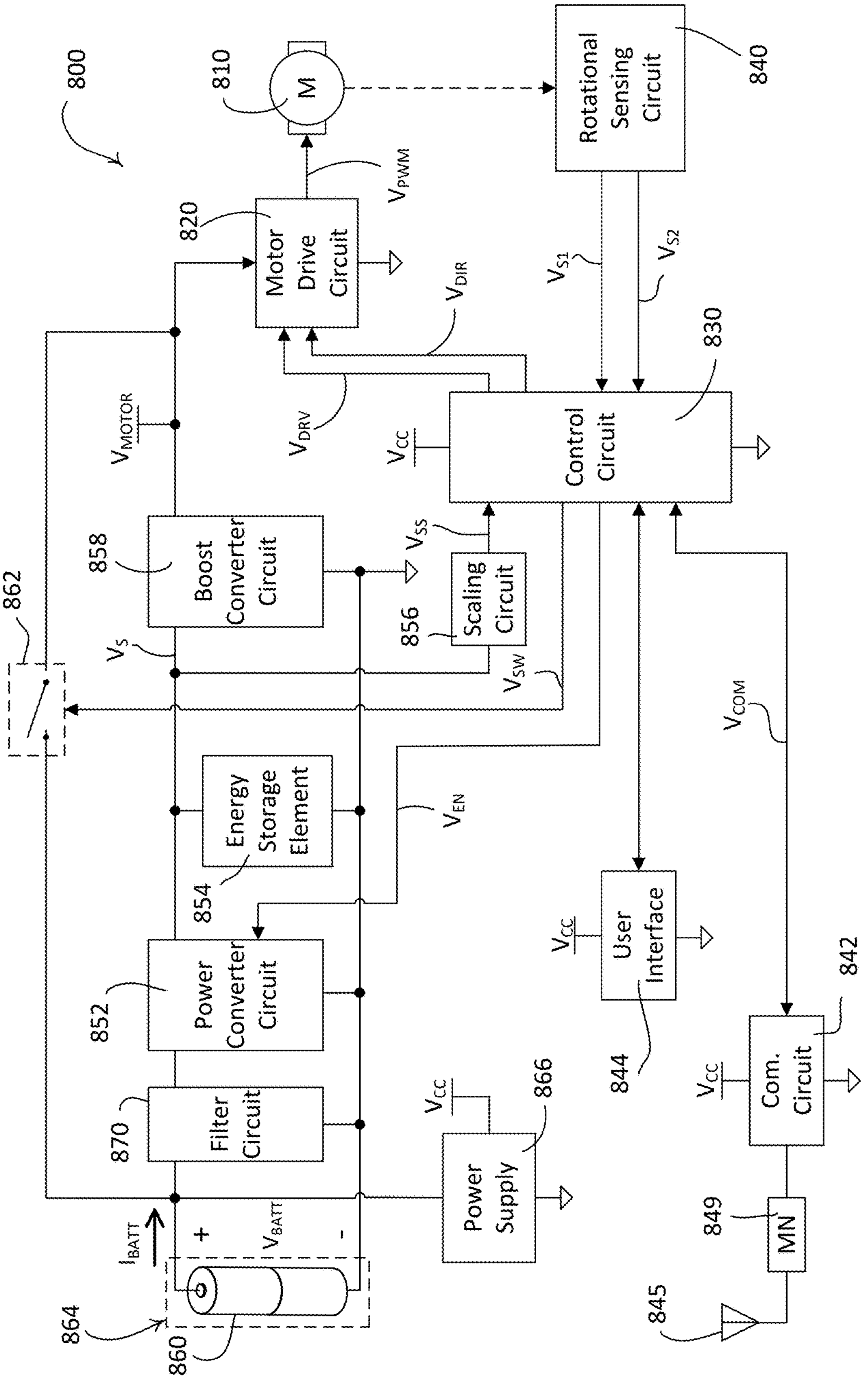
FIG. 16 is a block diagram of an example motor drive unit of a motorized window treatment.

FIG. 16 is a block diagram of an example motor drive unit 800 (e.g., the motor drive unit 390 shown in FIGS. 4-9, the motor drive unit 390' shown in FIGS. 12-14 and/or the motor drive unit 690 shown in FIG. 15) of a motorized window treatment (e.g., such as the motorized window treatment 100 shown in FIGS. 1 and 2, the motorized window treatment 200 shown in FIG. 3, the motorized window treatment 300 shown in FIGS. 4 and 5, the motorized window treatment 300' shown in FIGS. 12-14 and/or the motorized window treatment 600 shown in FIG. 15). The motor drive unit 800 may comprise a motor 810 (e.g., a direct-current (DC) motor) that may be coupled for raising and lowering a covering material. For example, the motor 810 may be coupled to a roller tube (e.g., roller tube 311 shown in FIGS. 4-5) of the motorized window treatment for rotating the roller tube for raising and lowering a flexible material (e.g., a shade fabric). The motor drive unit 800 may comprise a load control circuit, such as a motor drive circuit 820 (e.g., an H-bridge drive circuit) that may generate a pulse-width modulated (PWM) voltage $V_{PWM}$ for driving the motor 810 (e.g., to move the covering material between a fully-raised position and a fully-lowered position). In addition, the control circuit 830 may be configured to generate a direction signal for controlling the direction of rotation of the motor 810.

The motor drive unit 800 may comprise a control circuit 830 for controlling the operation of the motor 810. The control circuit 830 may comprise, for example, a microprocessor, a programmable logic device (PLD), a microcontroller, an application specific integrated circuit (ASIC), a field-programmable gate array (FPGA), or any suitable processing device or control circuit. The control circuit 830 may be configured to generate a drive signal $V_{DRV}$ for controlling the motor drive circuit 820 to control the rotational speed of the motor 810 (e.g. the motor drive circuit 820 receives the drive signal $V_{DRV}$ and controls, for example, an H-bridge circuit with appropriate PWM signals in response to the drive signal). In examples, the drive signal $V_{DRV}$ may comprise a pulse-width modulated signal, and the rotational speed of the motor 810 may be dependent upon a duty cycle of the pulse-width modulated signal. In examples, the control circuit 830 may directly control the motor 810 (e.g. in a configuration with no separate motor drive circuit 820). For example, the control circuit may generate two PWM signals for controlling the duty cycle and the polarity (e.g. controlling the speed and direction) of the motor 810. In addition, the control circuit 830 may be configured to generate a direction signal $V_{DIR}$ for controlling the motor drive circuit 820 to control the direction of rotation of the motor 810. The control circuit 830 may be configured to control the motor 810 to adjust a present position $P_{PRES}$ of the covering material of the motorized window treatment between a fully-raised position $P_{FULLY\text{-}RAISED}$ and a fully-lowered position $P_{FULL\text{-}LOWERED}$.

The motor drive unit 800 may include a rotational sensing circuit 840, e.g., a magnetic sensing circuit, such as a Hall effect sensor (HES) circuit, which may be configured to generate two signals $V_{S1}$, $V_{S2}$ (e.g., Hall effect sensor signals) that may indicate the rotational position and direction of rotation of the motor 810. The rotational sensing circuit 840 (e.g., HES circuit) may comprise two internal sensing circuits for generating the respective signals $V_{S1}$, $V_{S2}$ (e.g., HES signals) in response to a magnet that may be attached to a drive shaft of the motor 810. The magnet may be a circular magnet having alternating north and south pole regions, for example. For example, the magnet may have two opposing north poles and two opposing south poles, such that each sensing circuit of the rotational sensing circuit 840 is passed by two north poles and two south poles during a full rotation of the drive shaft of the motor 810. Each sensing circuit of the rotational sensing circuit 840 may drive the respective signal $V_{S1}$, $V_{S2}$ to a high state when the sensing circuit is near a north pole of the magnet and to a low state when the sensing circuit is near a south pole. The control circuit 830 may be configured to determine that the motor 810 is rotating in response to the signals $V_{S1}$, $V_{S2}$ generated by the rotational sensing circuit 840. In addition, the control circuit 830 may be configured to determine the rotational position and direction of rotation of the motor 810 in response to the signals $V_{S1}$, $V_{S2}$.

The motor drive unit 800 may include a communication circuit 842 (e.g., such as the control interface printed circuit board 354 shown in FIGS. 4 and 5) that may allow the control circuit 830 to transmit and receive communication signals, e.g., wired communication signals and/or wireless communication signals, such as radio-frequency (RF) signals. For example, the motor drive unit 800 may be configured to communicate messages (e.g., digital messages) with external control devices (e.g., other motor drive units) via the communication circuit 842 (e.g., via wireless signals, such as RF signals). The wireless communication circuit 842 may be coupled to an antenna 845 (e.g., the antenna 400 and/or the antenna 500) via a matching network 849 (e.g., the matching network 426 mounted to the coupling printed circuit board 420 and/or the matching network 526 mounted to the coupling printed circuit board 520). The matching network 849 may be configured to optimize the performance of the antenna 845. For example, the matching network 849 may include a filter (e.g., an inductor-capacitor (LC) filter) that is configured to match an impedance of the antenna 845 to an impedance of the wireless communication circuit 842 to obtain a maximum transfer of power between the antenna 845 and the communication circuit 842. The communication circuit 842 and/or the antenna 845 may be communicatively coupled (e.g., electrically connected) to the control circuit 830.

The motor drive unit 800 may communicate with one or more input devices, e.g., such as a remote control device, an occupancy sensor, a daylight sensor, and/or a shadow sensor. The remote control device, the occupancy sensor, the daylight sensor, and/or the shadow sensor may be wireless control devices (e.g., RF transmitters) configured to transmit messages to the motor drive unit 800 via the RF signals. For example, the remote control device may be configured to transmit digital messages via the RF signals in response to an actuation of one or more buttons of the remote control device. The occupancy sensor may be configured to transmit messages via the RF signals in response to detection of occupancy and/or vacancy conditions in the space in which the motorized window treatment is installed. The daylight sensor may be configured to transmit digital messages via RF signals in response to a measured amount of light inside of the space in which the motorized window treatment is installed. The shadow sensor may be configured to transmit messages via the RF signals in response to detection of a glare condition outside the space in which the motorized window treatment is installed.

The motorized window treatment may be configured to control the covering material according to a timeclock schedule. The timeclock schedule may be stored in the memory. The timeclock schedule may be defined by a user (e.g., a system administrated through a programming mode). The timeclock schedule may include a number of timeclock events. The timeclock events may have an event time and a corresponding command or preset. The motorized window treatment may be configured to keep track of the present time and/or day. The motorized window treatment may transmit the appropriate command or preset at the respective event time of each timeclock event.

The motor drive unit 800 may further comprise a user interface 844 having one or more actuators (e.g., mechanical switches) that allow a user to provide inputs to the control circuit 830 during setup and configuration of the motorized window treatment (e.g., in response to actuations of one or more buttons (e.g., the control button 152 shown in FIG. 1). The control circuit 830 may be configured to control the motor 810 to control the movement of the covering material in response to a shade movement command received from the communication signals received via the communication circuit 842 or the user inputs from the buttons of the user interface 844. The control circuit 830 may be configured to enable (e.g., via the control button 152 and/or the user interface 844) a user to pair the motorized window treatment with a remote control device and/or other external devices to allow for wireless communication between the remote control device and/or other external devices and the communication circuit 842 (e.g., an RF transceiver). The user interface 844 (e.g., the control button 152) may be configured to provide a status indication to a user. For example, user interface 844 (e.g. the control button 152) may be configured to flash and/or change colors to provide the status indication to the user. The status indication may indicate when the motorized window treatment is in a programming mode. The user interface 844 may also comprise a visual display, e.g., one or more light-emitting diodes (LEDs), which may be illuminated by the control circuit 830 to provide feedback to the user of the motorized window treatment system.

The motor drive unit 800 may comprise a memory (not shown) configured to store the present position $P_{PRES}$ of the covering material and/or the limits (e.g., the fully-raised position $P_{FULLY\text{-}RAISED}$ and the fully-lowered position $P_{FULLY\text{-}LOWERED}$), association information for associations with other devices and/or instructions for controlling the motorized window treatment. The memory may be implemented as an external integrated circuit (IC) or as an internal circuit of the control circuit 830.

The motor drive unit 800 may comprise a compartment 864 (e.g., which may be an example of the battery compartment 211 of the window treatment 200 shown in FIG. 3) that is configured to receive a DC power source. In some examples, the compartment 864 may be internal to the motor drive unit 800. In other examples, the compartment 864 may be external to the motor drive unit 800. In the example shown in FIG. 3, the DC power source is one or more batteries 860. In addition, alternate DC power sources, such as a solar cell (e.g., a photovoltaic cell), an ultrasonic energy source, and/or a radio-frequency (RF) energy source, may be coupled in parallel with the one or more batteries 860, or in some examples be used as an alternative to the batteries 860. The alternate DC power source may be used to perform the same and/or similar functions as the one or more batteries 860. In this example, the compartment 864 may be configured to receive one or more batteries 860 (e.g. four "D" batteries), such as the batteries 260, 360 of FIGS. 3-5. The batteries 860 may provide a battery voltage $V_{BATT}$ to the motor drive unit 800.

The motor drive unit 800 may comprise a filter circuit 870, a current limiting circuit, such as a power converter circuit 852, and an energy storage element 854 (e.g., an intermediate energy storage element such as the intermediate storage device 694 shown in FIG. 8A). In some examples, the motor drive unit 800 may include a second power converter, such as a boost converter circuit 858. Also, in some examples, the second power converter may be omitted from the motor drive circuit 800. The energy storage element 854 may comprise any combination of one or more super capacitors, one or more rechargeable batteries, and/or other suitable energy storage devices.

The filter circuit 870 may receive the battery voltage $V_{BATT}$. The power converter circuit 852 may draw a battery current $I_{BATT}$ from the batteries 860 through the filter circuit 870. The filter circuit 870 may filter high and/or low frequency components of the battery current $I_{BATT}$. In some examples, the filter circuit 870 may be a low-pass filter. Also, in some examples, the filter circuit 870 may be omitted from the motor drive circuit 800.

The power converter circuit 852 may be configured to limit the current drawn from the batteries 860 (e.g. allowing a small constant current to flow from the batteries 860). The power converter circuit 852 may receive the battery voltage $V_{BATT}$ via the filter circuit 870. In some examples, the power converter circuit 852 may comprise a step-down power converter, such as a buck converter. The power converter circuit 852 may be configured to charge the energy storage element 854 from the battery voltage $V_{BATT}$ to produce a storage voltage $V_S$ across the energy storage element 854 (e.g., approximately 3.5 volts). The motor drive circuit 820 may draw energy from the energy storage element 854 (e.g., via the boost converter circuit 858) to drive the motor 810. As such, the power converter circuit 852 may be configured to limit the current drawn from the batteries 860, for example, by producing a storage voltage $V_S$ and driving the motor 810 using the storage voltage $V_S$ stored across the energy storage element 854. In most cases, for instance, the motor drive circuit 820 may drive the motor 810 by drawing current from the energy storage element 854 and not drawing any current directly from the batteries 860. Further, it should be appreciated that, in some examples, the power converter circuit 852 may be omitted for another current limiting circuit, such as in instances where the battery voltage $V_{BATT}$ is the same as the storage voltage $V_S$ and power conversion (e.g., a step-up or step-down) is not needed to drive the motor 810.

The motor drive unit 800 may be configured to control when and how the energy storage element 854 charges from the batteries 860. The control circuit 830 may control when and how the energy storage element 854 charges from the batteries 860 based on the storage voltage $V_S$ of the energy storage element 854, such as when the storage voltage $V_S$ of the energy storage element 854 falls below a low-side threshold value (e.g., approximately 2.8 volts). For example, the control circuit 830 may be configured to receive a scaled storage voltage $V_{SS}$ via a scaling circuit 856 (e.g., a resistive divider circuit). The scaling circuit 856 may receive the storage voltage $V_S$ and may generate the scaled storage voltage $V_{SS}$. The control circuit 830 may determine the magnitude of the storage voltage $V_S$ of the energy storage element 854 based on the magnitude of the scaled storage voltage $V_{SS}$. When the control circuit 830 determines that the magnitude of the storage voltage $V_S$ of the energy storage element 854 falls below the low-side threshold value, the control circuit 830 may control a charging enable signal $V_{EN}$ (e.g., drive the charging enable control signal $V_{EN}$ high) to enable the power converter circuit 852. When the power converter circuit 852 is enabled, the power converter circuit 852 may be configured to charge the energy storage element 854 (e.g. from the batteries 860). When the power converter circuit 852 is disabled, the power converter circuit 852 may be configured to cease charging the energy storage element 854 (e.g. from the batteries 860).

The motor drive unit 800 may utilize the energy storage element 854 to draw a small constant current from the batteries 860 over a long period of time to extend the lifetime (e.g., and increase the total energy output) of the batteries 860. For example, the motor drive unit 800 (e.g., the power converter circuit 852 and/or the motor drive circuit 820) may limit the current drawn by the power converter circuit 852. The motor drive unit 800 may draw current from the batteries 860 that is less than the limit, but not more.

When enabled, the power converter circuit 852 may be configured to conduct an average current $I_{AVE}$ (e.g., having a magnitude of approximately 15 milliamps) from the batteries 860. The magnitude of the average current $I_{AVE}$ may be much smaller than a magnitude of a drive current required by the motor drive circuit 820 to rotate the motor 810. When the motor drive circuit 820 is driving the motor 810, the magnitude of the storage voltage $V_S$ of the energy storage element 854 may decrease with respect to time. When the motor drive circuit 820 is not driving the motor 810 and the power converter circuit 852 is charging the energy storage element 854, the magnitude of the storage voltage $V_S$ may increase (e.g., slowly increase). When the storage voltage $V_S$ of the energy storage element 854 falls below a low-side threshold value (e.g. approximately 2.8V), the control circuit 830 may enable the power converter circuit 852 to begin charging the energy storage element 854. The storage voltage $V_S$ may fall below the low-side threshold value after powering movements of the covering material, powering low-voltage components, and/or due to leakage currents over time. When the storage voltage $V_S$ of the energy storage element 854 rises above a high-side threshold value (e.g., approximately 3.5 volts), the control circuit 830 may cease driving the charging enable signal $V_{EN}$ high to disable the power converter circuit 852 and stop the charging of the energy storage element 854 from the batteries 860.

The motor drive unit 800 may further comprise the boost converter circuit 858 that receives the storage voltage $V_S$ and generates a motor voltage $V_{MOTOR}$ (e.g., approximately 5 volts) for powering the motor 810. The motor voltage $V_{MOTOR}$ may be larger than the storage voltage $V_S$. In some examples, a switch (e.g., a single pole double throw switch) may connect the batteries 860 and the energy storage element 854 to the boost converter 858 (e.g., if the required motor voltage level exceeds the present battery voltage $V_{BAT}$). When the control circuit 830 controls the motor drive circuit 820 to rotate the motor 810, the boost converter circuit 858 may conduct current from the energy storage element 854 to generate the motor voltage $V_{MOTOR}$. As noted above, in some examples, the motor drive unit 800 may not include the boost converter circuit 858, for example, based on the voltage requirements of the motor 810.

The motor drive unit 800 may also comprise a controllable switching circuit 862 coupled between the batteries 860 and the motor drive circuit 820. The control circuit 830 may generate a switch control signal $V_{SW}$ for rendering the controllable switching circuit 862 conductive and non-conductive. The control circuit 830 may be configured to render the controllable switching circuit 862 conductive to bypass the filter circuit 870, the power converter circuit 852, the energy storage element 854, and/or the boost converter circuit 858 to allow the motor drive circuit 820 to draw current directly from the batteries (e.g., when the energy storage element 854 is depleted). For example, the control circuit 830 may render the controllable switching circuit 862 conductive when the control circuit 830 determines that the magnitude of the storage voltage $V_S$ of the energy storage element 854 (e.g., based on the magnitude of the scaled storage voltage $V_{SS}$) is depleted below a threshold and the control circuit 830 has received an input or command to operate the motor 810 and, for example, does not have enough energy to complete a movement or an amount of movement of the covering material). For example, the control circuit may determine if the energy storage element 854 has enough energy to complete a movement or an amount of movement of the covering material by comparing a present storage level of the energy storage element 854 (e.g., the storage voltage $V_S$) to a threshold. The threshold may indicate a storage level sufficient to complete a full movement of the covering material from the fully-lowered position $P_{FULLY\text{-}LOWERED}$ to the fully-raised position $P_{FULLY\text{-}RAISED}$ (e.g., a fixed threshold). The threshold may be constant or may vary, for example, depending on the amount of movement of the covering material required by the received command, such that the threshold (e.g., a variable threshold) may indicate a storage level sufficient to complete the movement required by the received command.

If the energy storage element 854 is not sufficiently charged (e.g., does not have enough energy to move the covering material), the control circuit 830 may close the controllable switching circuit 862 at to allow the electrical load (e.g., the motor) to draw current directly from the batteries 860. Closing the controllable switching circuit 862 may bypass the energy storage element 854, such that the stored energy of the energy storage element 854 is not used for driving the motor 810 to move the covering material.

The control circuit 830 may be configured to determine when one or more of the batteries 860 are not installed in the compartment 864 when in the operating position. For example, the control circuit 830 may be configured to determine that one or more of the batteries 860 are missing when the magnitude of the battery voltage $V_{BATT}$ drops to approximately zero volts (e.g., there is an open circuit between the battery contacts). The control circuit 830 may be configured to determine the magnitude of the battery voltage $V_{BATT}$ in response to a scaled battery voltage $V_{BATT\text{-}S}$ received via a scaling circuit 866 (e.g., a resistive divider circuit). The scaling circuit 866 may receive the battery voltage $V_{BATT}$ and may generate the scaled battery voltage $V_{BATT\text{-}S}$. The control circuit 830 may be configured to disable (e.g., automatically disable) the operation of the motor 810 of the motor drive unit 800 in response to the scaled battery voltage $V_{BATT\text{-}S}$, such that the covering material cannot be raised or lowered when one or more of the batteries 860 are not installed in the battery compartment 864, which may prevent depletion of the intermediate storage element 854. The control circuit 830 may be configured to enable the operation of the motor 810 in response to the scaled battery voltage $V_{BATT\text{-}S}$ when all of the batteries 860 are installed.

The motor drive unit 800 may comprise a power supply 880 (e.g., a low-voltage power supply). The power supply 880 may receive the battery voltage $V_{BATT}$. The power supply 880 may be configured to produce a low-voltage supply voltage $V_{CC}$ (e.g., approximately 3.3 volts) for powering low-voltage circuitry of the motor drive unit 800, such as the user interface 844, the communication circuit 842, and the control circuit 830. Further, in some examples, the power supply 880 may be omitted from the motor drive unit 800 (e.g. if the low-voltage circuitry of the motor drive unit 800 is able to be powered directly from the storage voltage $V_S$). Additionally or alternatively, the motor drive unit 800 may comprise a power supply (not shown) that may receive the storage voltage $V_S$ and generate the low voltage $V_{CC}$ (e.g., approximately 3.3 V) for powering the control circuit 830 and other low-voltage circuitry of the motor drive unit 800, e.g., the user interface 844, the communication circuit 842, and the control circuit 830.

The invention claimed is:

1. A motorized window treatment comprising:

a roller tube configured to windingly receive a flexible material and to be rotated to raise and lower the flexible material;

a motor drive unit received within a cavity of the roller tube, the motor drive unit comprising:

a motor configured to rotate the roller tube;

a housing configured to house the motor, the housing comprising at least one channel formed in a surface of the housing; and an antenna comprising an electrical conductor;

at least one mounting bracket configured to support the roller tube such that the roller tube can rotate with respect to the at least one mounting bracket; and a bearing assembly coupled to the roller tube and located between the roller tube and the mounting bracket, wherein a gap is defined between the roller tube and the mounting bracket, and wherein the electrical conductor of the antenna is wrapped around the housing of the motor drive unit adjacent to the gap between the roller tube and the mounting bracket and within an area defined by a rotatable portion of the bearing assembly, wherein the electrical conductor of the antenna is configured to be received within the at least one channel when wrapped around the housing.

2. The motorized window treatment of claim 1, wherein the motor drive unit comprises a wireless communication circuit electrically coupled to the antenna for transmitting and receiving wireless signals.

3. The motorized window treatment of claim 1, wherein the at least one channel comprises at least two peripheral channels that extend parallel to each other around the circumference of the housing in an outer surface of the housing.

4. The motorized window treatment of claim 3, wherein the at least two peripheral channels are joined together at a recess and the electrical conductor of the antenna is configured to pass from one peripheral channel to another via the recess.

5. The motorized window treatment of claim 1, wherein the at least one channel comprises a single spiral-shaped channel.

6. The motorized window treatment of claim 5, wherein the spiral-shaped channel is configured such that the antenna moves away from the roller tube in the longitudinal direction as the antenna wraps around the housing.

7. The motorized window treatment of claim 2, wherein the motor drive unit comprises a motor drive printed circuit board on which drive circuitry for controlling the motor is mounted.

8. The motorized window treatment of claim 7, wherein the motor drive unit further comprises a battery compartment for receiving one or more batteries for powering the drive circuitry on the motor drive printed circuit board and the wireless communication circuit, the housing comprising a cap for covering an end of the battery compartment, the battery compartment located between the cap and the motor drive printed circuit board.

9. The motorized window treatment of claim 8, wherein the wireless communication circuit is located inside the cap.

10. The motorized window treatment of claim 8, further comprising a matching network circuit that is coupled to the motor drive printed circuit board, wherein the matching network circuit is located inside the cap.

11. The motorized window treatment of claim 9, wherein the wireless communication circuit is coupled to the motor drive printed circuit board via a ribbon cable.

12. The motorized window treatment of claim 7, wherein the motor drive unit comprises a coupling printed circuit board located near the gap between the roller tube and the mounting bracket and having a matching network circuit mounted thereto, and wherein the antenna is electrically coupled to the matching network circuit on the coupling printed circuit board.

13. The motorized window treatment of claim 12, wherein the wireless communication circuit is mounted to the motor drive printed circuit board and electrically connected to the matching network circuit on the coupling printed circuit board by a coaxial cable.

14. The motorized window treatment of claim 1, wherein the motor drive unit comprises a flexible printed circuit board, and wherein the antenna is formed on the flexible printed circuit board.

15. The motorized window treatment of claim 1, wherein the bearing assembly enables the roller tube is to rotate around the motor drive unit.

16. The motorized window treatment of claim 15, wherein the bearing assembly is made of a non-conductive material.

17. The motorized window treatment of claim 16, wherein the antenna is wrapped around the motor drive unit within an area that surrounds the circumference of the motor drive unit underneath the bearing assembly.

18. The motorized window treatment of claim 1, wherein at least a portion of the antenna is aligned with the gap between the roller tube and the at least one mounting bracket.

19. The motorized window treatment of claim 18, wherein the gap between the roller tube and the at least one mounting bracket defines an area comprising non-conductive components.

20. The motorized window treatment of claim 1, wherein the roller tube is made of a conductive material, and the antenna is configured to be electromagnetically coupled to the roller tube.

21. The motorized window treatment of claim 1, wherein the roller tube and the mounting bracket are both made of conductive materials.

22. The motorized window treatment of claim 1, wherein the housing comprises a body and a cap that is configured to attach to the body.

23. The motorized window treatment of claim 22, wherein the at least one channel is defined in the body such that the antenna is wrapped around the body.

* * * * *